US010764207B2

(12) United States Patent
Rao

(10) Patent No.: US 10,764,207 B2
(45) Date of Patent: Sep. 1, 2020

(54) SOFTWARE DEFINED VISIBILITY FABRIC

(71) Applicant: Gigamon Inc., Santa Clara, CA (US)

(72) Inventor: Anil Rao, Santa Clara, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

(21) Appl. No.: 15/706,470

(22) Filed: Sep. 15, 2017

(65) Prior Publication Data

US 2018/0013697 A1    Jan. 11, 2018

Related U.S. Application Data

(63) Continuation of application No. 14/610,496, filed on Jan. 30, 2015, now Pat. No. 9,794,193.

(51) Int. Cl.
| | |
|---|---|
| *H04L 12/933* | (2013.01) |
| *H04L 12/931* | (2013.01) |
| *H04L 12/46* | (2006.01) |
| *G06F 9/00* | (2006.01) |
| *H04L 12/715* | (2013.01) |

(52) U.S. Cl.
CPC ............. *H04L 49/10* (2013.01); *G06F 9/00* (2013.01); *H04L 12/4641* (2013.01); *H04L 45/64* (2013.01); *H04L 49/70* (2013.01)

(58) Field of Classification Search
None
See application file for complete search history.

(56) References Cited

U.S. PATENT DOCUMENTS

| | | | | |
|---|---|---|---|---|
| 9,142,004 | B2 * | 9/2015 | Abiezzi | G06T 1/20 |
| 2002/0129127 | A1 * | 9/2002 | Romero | G06F 9/505 |
| | | | | 709/220 |
| 2009/0177727 | A1 * | 7/2009 | Radia | G06F 9/5044 |
| | | | | 709/201 |
| 2010/0080226 | A1 * | 4/2010 | Khalid | H04L 41/5003 |
| | | | | 370/392 |
| 2011/0202678 | A1 * | 8/2011 | LaVoie | H04L 67/327 |
| | | | | 709/238 |
| 2012/0151051 | A1 * | 6/2012 | Zhang | H04L 67/06 |
| | | | | 709/224 |
| 2012/0281540 | A1 * | 11/2012 | Khan | H04W 40/34 |
| | | | | 370/241 |
| 2012/0324471 | A1 * | 12/2012 | Yanagisawa | G06F 11/3442 |
| | | | | 718/105 |
| 2013/0073744 | A1 * | 3/2013 | Ratica | G06F 9/4451 |
| | | | | 709/240 |

(Continued)

OTHER PUBLICATIONS

Final Office Action dated Mar. 17, 2017 for U.S. Appl. No. 14/610,496 of A. Rao, filed Jan. 30, 2015.

(Continued)

*Primary Examiner* — Andrew C Oh
(74) *Attorney, Agent, or Firm* — Perkins Coie LLP

(57) ABSTRACT

A fabric manager includes: a processing unit having a service chain creation module configured to create a service chain by connecting some of a plurality of nodes via virtual links; wherein the some of the plurality of nodes represent respective network components of an auxiliary network configured to obtain packets from a traffic production network; and wherein the service chain is configured to control an order of the network components represented by the some of the plurality of nodes packets are to traverse.

20 Claims, 11 Drawing Sheets

(56) References Cited

U.S. PATENT DOCUMENTS

| | | | | |
|---|---|---|---|---|
| 2013/0301641 | A1* | 11/2013 | Anand | H04L 63/0263 370/389 |
| 2014/0012985 | A1* | 1/2014 | Zhou | H04L 69/24 709/224 |
| 2014/0050223 | A1 | 2/2014 | Foo et al. | |
| 2014/0337085 | A1* | 11/2014 | Li | G06Q 10/0633 705/7.27 |
| 2014/0355436 | A1* | 12/2014 | Zhang | H04L 41/0896 370/232 |
| 2014/0362857 | A1* | 12/2014 | Guichard | H04L 69/22 370/392 |
| 2015/0081855 | A1* | 3/2015 | Zhang | H04L 41/5054 709/220 |
| 2015/0085870 | A1* | 3/2015 | Narasimha | H04L 45/44 370/409 |
| 2015/0089082 | A1 | 3/2015 | Nellikar et al. | |
| 2015/0138973 | A1* | 5/2015 | Kumar | H04L 45/12 370/235 |
| 2015/0163150 | A1* | 6/2015 | Beheshti-Zavareh | H04L 45/02 370/400 |
| 2015/0215172 | A1 | 7/2015 | Kumar et al. | |
| 2015/0222640 | A1* | 8/2015 | Kumar | H04L 47/782 370/230 |
| 2015/0271102 | A1* | 9/2015 | Antich | H04L 47/781 370/230 |
| 2015/0289203 | A1* | 10/2015 | Zhang | H04W 64/006 455/436 |
| 2015/0295831 | A1 | 10/2015 | Kumar et al. | |
| 2015/0372840 | A1 | 12/2015 | Benny et al. | |
| 2015/0381493 | A1* | 12/2015 | Bansal | H04L 45/30 370/392 |
| 2016/0050131 | A1* | 2/2016 | Zhang | H04L 43/0811 370/244 |
| 2016/0085577 | A1* | 3/2016 | Gray | G06F 9/45558 718/1 |
| 2016/0149788 | A1 | 5/2016 | Zhang et al. | |
| 2016/0173392 | A1* | 6/2016 | Syrjanen | H04L 12/4633 709/223 |
| 2016/0179582 | A1* | 6/2016 | Skerry | G06F 9/45558 718/1 |
| 2016/0182684 | A1* | 6/2016 | Connor | G06F 9/45558 709/203 |
| 2016/0308961 | A1* | 10/2016 | Rao | H04L 67/1029 |
| 2016/0344611 | A1* | 11/2016 | M S Ivars | H04L 45/38 |
| 2016/0373359 | A1* | 12/2016 | Bruun | H04L 47/20 |

OTHER PUBLICATIONS

Non Final Office Action dated Nov. 28, 2016, for U.S. Appl. No. 14/610,496 of A. Rao, filed Jan. 30, 2015.

Notice of Allowance dated Jun. 19, 2017 for U.S. Appl. No. 14/610,496 for A. Rao, filed Jan. 30, 2015.

* cited by examiner

SOFTWARE DEFINED VISIBILITY FABRIC

CROSS-REFERENCE TO RELATED APPLICATIONS

This application is a continuation of U.S. patent application Ser. No. 14/610,496, filed Jan. 30, 2015, which is incorporated by reference herein in its entirety.

FIELD

This application relates generally to network traffic monitoring, and more specifically, to systems and methods for network traffic monitoring.

BACKGROUND

A major task in network traffic monitoring involves capturing packets entering and/or leaving various network components, and delivering the packets to appropriate tools for analysis. For example, in a virtualized network environment, multiple virtual machines (VMs) may be conversing with each other and with external end-points. Capturing network traffic from these VMs to provide just the right selection of network traffic for a tool to perform its task may be difficult.

Also, as packets are passed through various network components, the network components may perform packet processing with different respective packet processing efficiencies and capabilities. If the path of packet transmission from a target to a tool is not set up properly, the result may be over-processing of packets, leading to lower packet processing efficiency. In other cases, the result may be under-processing of packets, leading to a tool's inability to perform its task.

SUMMARY

A fabric manager includes: a processing unit having a service chain creation module configured to create a service chain by connecting some of a plurality of nodes via virtual links; wherein the some of the plurality of nodes represent respective network components of an auxiliary network configured to obtain packets from a traffic production network; and wherein the service chain is configured to control an order of the network components represented by the some of the plurality of nodes packets are to traverse.

Optionally, the service chain is flexible in a sense that it is modifiable and/or scalable.

Optionally, the service chain creation module comprises an overlay module configured to create the service chain using overlay technique.

Optionally, the overlay module is configured to create multiple overlays over the traffic production network, and wherein packets associated with the respective overlays are isolated from each other.

Optionally, the auxiliary network is configured to pass the packets obtained from the traffic production network to one or more network monitoring tools in an out-of-band manner.

Optionally, the plurality of nodes are organized into different respective categories of nodes that includes at least a first category of nodes, a second category of nodes, and a third category of nodes.

Optionally, one of the nodes in the first category of nodes represents a host-level virtual switch.

Optionally, one of the nodes in the second category of nodes represents a virtual machine.

Optionally, one of the nodes in the third category of nodes represents a physical network switch appliance configured to communicate with one or more network monitoring tools.

Optionally, the nodes in the first category of nodes are configured to provide a first category of services, the nodes in the second category of nodes are configured to provide a second category of services, and the nodes in the third category of nodes are configured to provide a third category of services.

Optionally, the service chain creation module is configured to create at least a part of the service chain by connecting one of the nodes in the first category of nodes to two or more of the nodes in the second category of nodes to create a redundancy in the second category of services.

Optionally, the service chain creation module is configured to create at least a part of the service chain by connecting one of the nodes in the second category of nodes to two or more of the nodes in the third category of nodes to create a redundancy in the third category of services.

Optionally, the service chain creation module is configured to create at least a part of the service chain by connecting one of the nodes in the first category of nodes to one of the nodes in the third category of nodes to bypass the nodes in the second category.

Optionally, the service chain creation module is configured to create at least a part of the service chain by connecting one of the nodes in the first category of nodes to a network monitoring tool while bypassing the nodes in the second category of nodes and the nodes in the third category of nodes.

Optionally, the service chain creation module is configured to create at least a part of the service chain by sequentially connecting at least two of the nodes in the first category of nodes, sequentially connecting at least two of the nodes in the second category of nodes, sequentially connecting at least two of the nodes in the third category of nodes, or any combination of the foregoing.

Optionally, the service chain creation module is configured to modify the service chain by adding one or more of the nodes in the first category of nodes to the network, adding one or more of the nodes in the second category of nodes to the network, adding one or more of the nodes in the third category of nodes to the network, or any combination of the foregoing.

Optionally, the service chain creation module is configured to modify the service chain by replacing one of the nodes in the first category of nodes with another one of the nodes in the first category of nodes, replacing one of the nodes in the second category of nodes with another one of the nodes in the second category of nodes, replacing one of the nodes in the third category of nodes with another one of the nodes in the third category of nodes, or any combination of the foregoing.

Optionally, the service chain creation module is configured to balance packet processing efficiency and service intelligence when creating the service chain.

Optionally, the service chain creation module is configured to determine the service chain that has the highest efficiency.

Optionally, the some of the plurality of nodes in the service chain do not participate in a traffic production.

Optionally, the processing unit is integrated with a SDN controller.

A method of creating a network includes: accessing a non-transitory medium storing information regarding a plurality of nodes; and creating a service chain that includes at least some of the plurality of nodes using a processing unit, wherein the processing unit includes a service chain creation module configured to create virtual links to connect the some of the plurality of nodes to create a service chain; wherein the some of the plurality of nodes represent respective network components of an auxiliary network configured to obtain packets from a traffic production network; and wherein the service chain is configured to control an order of the network components represented by the some of the plurality of nodes packets are to traverse.

Optionally, the service chain is flexible in a sense that it is modifiable and/or scalable.

Optionally, the service chain creation module comprises an overlay module configured to create the service chain using overlay technique.

Optionally, the overlay module is configured to create multiple overlays over the traffic production network, and wherein packets associated with the respective overlays are isolated from each other.

Optionally, the auxiliary network is configured to pass the packets obtained from the traffic production network to one or more network monitoring tools in an out-of-band manner.

Optionally, the plurality of nodes are organized into different respective categories that includes at least a first category of nodes, a second category of nodes, and a third category of nodes.

Optionally, one of the nodes in the first category of nodes represents a host-level virtual switch.

Optionally, one of the nodes in the second category of nodes represents a virtual machine.

Optionally, one of the nodes in the third category of nodes represents a network switch appliance configured to communicate with one or more network monitoring tools.

Optionally, the nodes in the first category of nodes are configured to provide a first category of services, the nodes in the second category of nodes are configured to provide a second category of services, and the nodes in the third category of nodes are configured to provide a third category of services.

Optionally, at least a part of the service chain is created by connecting one of the nodes in the first category of nodes to two or more of the nodes in the second category of nodes to create a redundancy in the second category of services.

Optionally, at least a part of the service chain is created by connecting one of the nodes in the second category of nodes to two or more of the nodes in the third category of nodes to create a redundancy in the third category of services.

Optionally, at least a part of the service chain is created by connecting one of the nodes in the first category of nodes to one of the nodes in the third category of nodes to bypass the nodes in the second category of nodes.

Optionally, at least a part of the service chain is created by connecting one of the nodes in the first category of nodes to a network monitoring tool while bypassing the nodes in the second category of nodes and the nodes in the third category of nodes.

Optionally, at least a part of the service chain is created by sequentially connecting at least two of the nodes in the first category of nodes, sequentially connecting at least two of the nodes in the second category of nodes, sequentially connecting at least two of the nodes in the third category of nodes, or any combination of the foregoing.

Optionally, the method further includes modifying the service chain by adding one or more of the nodes in the first category of nodes to the service chain, adding one or more of the nodes in the second category of nodes to the service chain, adding one or more of the nodes in the third category of nodes to the service chain, or any combination of the foregoing.

Optionally, the method further includes modifying the service chain by replacing one of the nodes in the first category of nodes with another one of the nodes in the first category of nodes, replacing one of the nodes in the second category of nodes with another one of the nodes in the second category of nodes, replacing one of the nodes in the third category of nodes with another one of the nodes in the third category of nodes, or any combination of the foregoing.

Optionally, the processing unit is configured to balance packet processing efficiency and service intelligence when creating the network.

Optionally, the created network has the highest efficiency.

Optionally, the created network does not participate in the traffic production.

Optionally, the processing unit is integrated with a SDN controller.

An apparatus includes a non-transitory medium storing a set of instruction, an execution of which by a processing unit causes a method to be performed, the method comprising: accessing a database storing information regarding a plurality of nodes; and creating a service chain that includes at least some of the plurality of nodes, wherein the act of creating the service chain comprises creating virtual links to connect the some of the plurality of nodes; wherein the some of the plurality of nodes represent respective network components of an auxiliary network configured to obtain packets from a traffic production network; and wherein the service chain is configured to control an order of the network components represented by the some of the plurality of nodes packets are to traverse.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
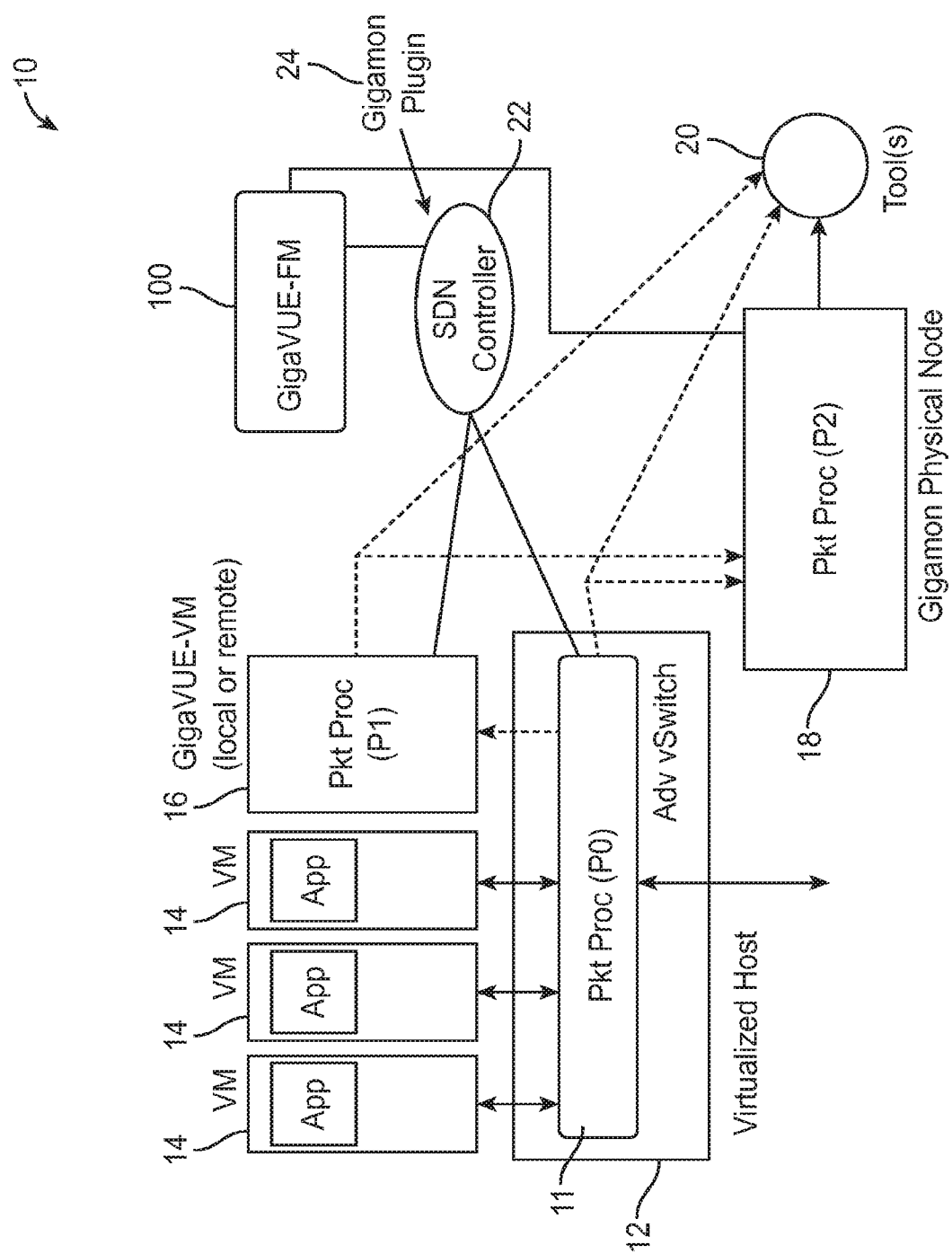
FIG. 1 illustrates a network in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

General Description

Embodiments described herein are directed to a new kind of auxiliary network called the Software Defined Visibility Fabric that is flexible, efficient and intelligent. The auxiliary network obtains packets from a traffic production network in an out-of-band configuration, and passes the packets to one or more tools, where the packets are analyzed for network traffic monitoring.

The Software Defined Visibility Fabric is a policy driven overlay network of chained service nodes. Each service node represents a packet processing station (e.g., network component) that can filter, manipulate and dispatch network packets. The overlay network is built by linking these nodes together using IP tunnels (GRE, VxLAN, etc.). Different kinds of service nodes, each offering varying levels of capability, may exist within the fabric as shown below:

P0 Node Host-level (advanced) virtual switch
P1 Node Virtual monitoring appliance
P2 Node Physical monitoring appliance P0 nodes straddle the boundary between the production network (where normal VM traffic is flowing) and the Software Defined Visibility Fabric. Their use helps eliminate unwanted traffic closer to the VMs being monitored, thereby freeing up precious bandwidth and reducing processing cycles consumed by other fabric nodes. The P1 nodes can aggregate traffic originating from several P0 and P1 nodes. Similarly, P2 nodes can aggregate traffic from several P0, P1 and P2 nodes.

The P0 service node provides the lowest degree of packet filtering, packet manipulating, and packet forwarding services. The P1 service node provides an intermediate degree of packet filtering, packet manipulating, and packet forwarding services. The P2 service node provides the highest degree of packet filtering, packet manipulating, and packet forwarding services. Accordingly, the P2 service node has higher packet processing intelligence than P1 service node, and the P1 service node has higher packet processing intelligence than P0 service node. On the other hand, the P0 node has higher packet processing efficiency than P1 node, and the P1 node has higher packet processing efficiency than P2 node.

Software Defined Networking (SDN) principles are employed for managing the service nodes P0, P1, P2. In particular, a fabric manager is provided, which operates based on SDN principles. The fabric manager is where all control and policy decisions are made, and is responsible for defining the behavior and roles of all P0, P1 and P2 nodes (that constitute the distributed data plane). The fabric manager is also configured to create a service chain that connects two or more of the service nodes in the auxiliary network. The service chain dictates the service nodes in the auxiliary network, and an order of the service nodes, packets are to traverse before reaching one or more tool(s) for network monitoring. During use, traffic from a monitored VM will flow through one or more service nodes in the auxiliary network to reach desired tool(s) according to a service chain determined by the fabric manager. The use of overlay networks allows the auxiliary network (the visibility fabric) to be deployed on top of existing physical and virtual networks, while maintaining full isolation from the traffic production network.

In some embodiments, the fabric manager's policy engine attempts to create the shortest possible (most efficient) service chain. The more expensive service nodes that provide higher packet processing intelligence (e.g., P2 nodes) are included only when the added benefits provided by them are required. In this way the fabric manager is constantly trying to balance efficiency versus intelligence.

Since the fabric manager provides a centralized policy decision, the individual service nodes can be utilized more efficiently within the overall Software Defined Visibility Fabric. Also, the Software Defined Visibility Fabric offers several advantages, including flexibility, efficiency, scalability, and intelligence.

Flexibility: The fabric manager can modify and/or scale a service chain as needed. For example, the fabric manager can add redundant P1 node(s) and/or P2 node(s) between targets being monitored (e.g., VMs, vNIC, etc.) and tool(s). Also, new P1 service nodes can be instantiated by the fabric manager on demand to provide additional processing capability. In addition, use of overlay networks allows P1 nodes to be relocated from one virtualized server to another.

Efficiency: Since any type of service node can forward traffic to a tool, the fabric manager can shorten the service chains, by eliminating P1 and/or P2 nodes, in certain cases based on a balance between efficiency and intelligence. For example, in some situations, the more advance packet processing intelligence provided by the P1 node and the P2 node may not be needed. In such cases, the service chain may not include P1 and/or P2 nodes.

Scalability: Several scale-out configurations are possible by employing multiple P1 and P2 nodes and dividing up the filtering, manipulating and forwarding tasks among them.

Intelligence: When more intelligence is necessary, nodes with high packet processing intelligence (e.g., P2 nodes) can be used in the chain. These nodes typically provide more advanced capability as compared to the P1 nodes and the P0 nodes.

Detailed Description

A major task in virtual machine (VM) traffic monitoring involves capturing packets entering and/or leaving VMs and delivering them to appropriate tools for analysis. In a virtualized environment, where multiple VMs may be conversing with each other and with external end-points, the challenge is to provide each tool with just the right selection of network traffic needed to perform its task. One way to achieve this, without adversely affecting VM traffic patterns, is to mirror packets associated with certain VMs to an out-of-band network where they can be processed and eventually forwarded to the respective tools. In accordance with some embodiments, a new kind of auxiliary network is provided for this purpose that is flexible, efficient, and intelligent. This auxiliary network (called "Software Defined Visibility Fabric") is a policy driven network of chained service nodes. Each service node represents a packet processing station that can filter, manipulate and dispatch network packets. The auxiliary network is built by linking these service nodes together, e.g., using IP tunnels such as GRE, VxLAN, etc., to create a chain of service nodes.

FIG. 1 illustrates a network 10 in accordance with some embodiments. The network 10 is an auxiliary network that is configured to obtain packets from a traffic production network, and to pass the packets to one or more tools for network monitoring. As shown in the figure, the auxiliary network 10 includes a virtual switch 11 implemented in a host 12, and a virtual machine (VM) 16 supported by the host 12. In the illustrated example, the host 12 that implements the virtual switch 11 is also the same host that supports the VM 16. In other examples, there may be one host 12 implementing the virtual switch 11, and another host 12 supporting the VM 16. As shown in the figure, the host 12 also supports multiple virtual machines VMs 14, but the VMs 14 are not a part of the auxiliary network. The network 10 also includes a physical network device 18 communicatively coupled to the host 12 and/or the VM 16. The network device 18 is configured to communicate with one or more tools 20. In some cases, each tool 20 may be a network monitoring tool configured to analyze packets for network monitoring. In other cases, each tool 20 may be any of other types of packet processing tools. The VMs 14 may be configured to run different applications to process packets and/or to perform other types of tasks. The VM 16 is configured to perform packet processing to pass packets downstream for analysis by the tool(s) 20. As shown in the figure, a Software Defined Networking (SDN) controller 22 may be configured to control the behavior of the virtual switch 11 and the VM 16.

The VM 16 and the network device 18 are parts of an auxiliary network configured to obtain packets from a production network, and to pass the packets to the tool(s) 20 for analysis. Thus, the VM 16 and the network device 18 are not parts of the production network. The virtual switch 11 is special because it can straddle the boundary between the production network and the auxiliary network. Thus, it is a part of the production network. If the virtual switch is used as a P0 node by the visibility fabric, then it is also a part of the auxiliary network. Not all virtual switches may be used as a P0 node. However, those that meet certain criteria of a visibility fabric service node (e.g., those that are capable of filtering, manipulation, and forwarding packets) can be used as a P0 node.

In the illustrated embodiments, the virtual switch 11, the VM 16, and the network device 18 are respective service nodes P0, P1, P2, each offering varying levels of capability, as follows:

P0 Node Host-level (advanced) virtual switch 11 (lowest capability)

P1 Node Virtual monitoring appliance 16 (intermediate capability)

P2 Node Physical monitoring appliance 18 (highest capability)

In particular, each service node is capable of providing some degree of packet filtering, packet manipulating, and packet forwarding services. The P0 service node provides the lowest degree of packet filtering, packet manipulating, and packet forwarding services. The P1 service node provides an intermediate degree of packet filtering, packet manipulating, and packet forwarding services. The P2 service node provides the highest degree of packet filtering, packet manipulating, and packet forwarding services. Accordingly, the P2 service node has higher packet processing intelligence than P1 service node, and the P1 service node has higher packet processing intelligence than P0 service node. On the other hand, the P0 node has higher packet processing efficiency than P1 node, and the P1 node has higher packet processing efficiency than P2 node.

The P0 nodes straddle the boundary between a production network (where normal network traffic, such as VM traffic, is flowing) and the auxiliary network (Software Defined Visibility Fabric). Their use helps eliminate unwanted traffic closer to the VMs being monitored, thereby freeing up precious bandwidth and reducing processing cycles consumed by other nodes. The P1 nodes may aggregate traffic originating from several P0 and P1 nodes, and offer some advanced packet manipulation capabilities. Similarly, P2 nodes may aggregate traffic from several P0, P1 and P2 nodes and provide the highest levels of capacity, performance and packet manipulation capabilities.

The network device 18 is configured to receive packets, and pass the packets to one or more tools 20. In some cases, the network device 18 may be configured to receive normal packets (e.g., packets not from a virtualized network), as well as virtualized packets (e.g., packets with tunnel format that includes encapsulation of the original packets resulted from virtualization technology). In other cases, the network device 18 may be configured to receive only virtualized packets. Also, in some cases, the network device 18 may be any switch module that provides packet transmission in accordance with a pre-determined transmission scheme. In some embodiments, the network device 18 may be user-configurable such that packets may be transmitted in a one-to-one configuration (i.e., from one network port to an instrument port). As used in this specification, the term "instrument port" refers to any port that is configured to transmit packets to a tool (e.g., tool 20), wherein the tool may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the tool may be a pass-through device (i.e., it can receive packets, and transmit the packets back to the device 100 after the packets have been processed), such as an intrusion prevention system. In other embodiments, the network device 18 may be configured such that the packets may be transmitted in a one-to-many configuration (i.e., from one network port to multiple instrument ports). In other embodiments, the network device 18 may be configured such that the packets may be transmitted in a many-to-many configuration (i.e., from multiple network ports to multiple instrument ports). In further embodiments, the network device 18 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the network device 18 so that the packets (or certain types of packets) are routed according to any one of these configurations. Also, in some embodiments, the network device 18 may be an "out-of-band" network device, which is configured to obtain packets and pass them to a tool or to a network that is different from that associated with the original intended destination of the packets. Thus, the network device 18 is not a part of the underlying network that performs packet production.

As shown in the figure, a fabric manager 100 is provided. As will be described in further detail below, the fabric manager 100 is configured to create one or more service chains that connect service nodes (e.g., P0 node(s), P1 node(s), P2 node(s), etc.). Each service chain dictates the network components (as represented by the service nodes), and an order of the network components, the packets are to traverse in the auxiliary network before reaching one or more tool(s) for network monitoring. The fabric manager 100 is configured to communicate with the SDN controller 22 and the network device 18. In some cases, the fabric manager 100 may integrate with the SDN controller 22 through a plug-in 24. For example, in some cases, in a SDN enabled datacenter supporting virtualized workloads, the host-level virtual switches 11 may be under the control of the SDN controller 22. Since these switches 11 serve as service nodes in the SDN fabric, the fabric manager 100 may be integrated with the SDN controller 22 using the plug-in 24. The upper-half of the plug-in 24 may export an API that is specifically designed to satisfy the needs of the fabric manager 100. The lower-half of the plug-in 24 may be controller specific (e.g., different lower-halves of the plug-in 24 may be implemented for different controllers). In such an environment, it is possible for the fabric manager 100 to also manage the VMs 16 and the network devices 18 using the SDN controller 22, provided they are compatible with the controller's 22 Control-Data-Plane-Interface. If not, the fabric manager 100 may directly manage the VMs 16 and the network devices 18. In other cases, the plug-in 24 may not be needed.

Figure 2:
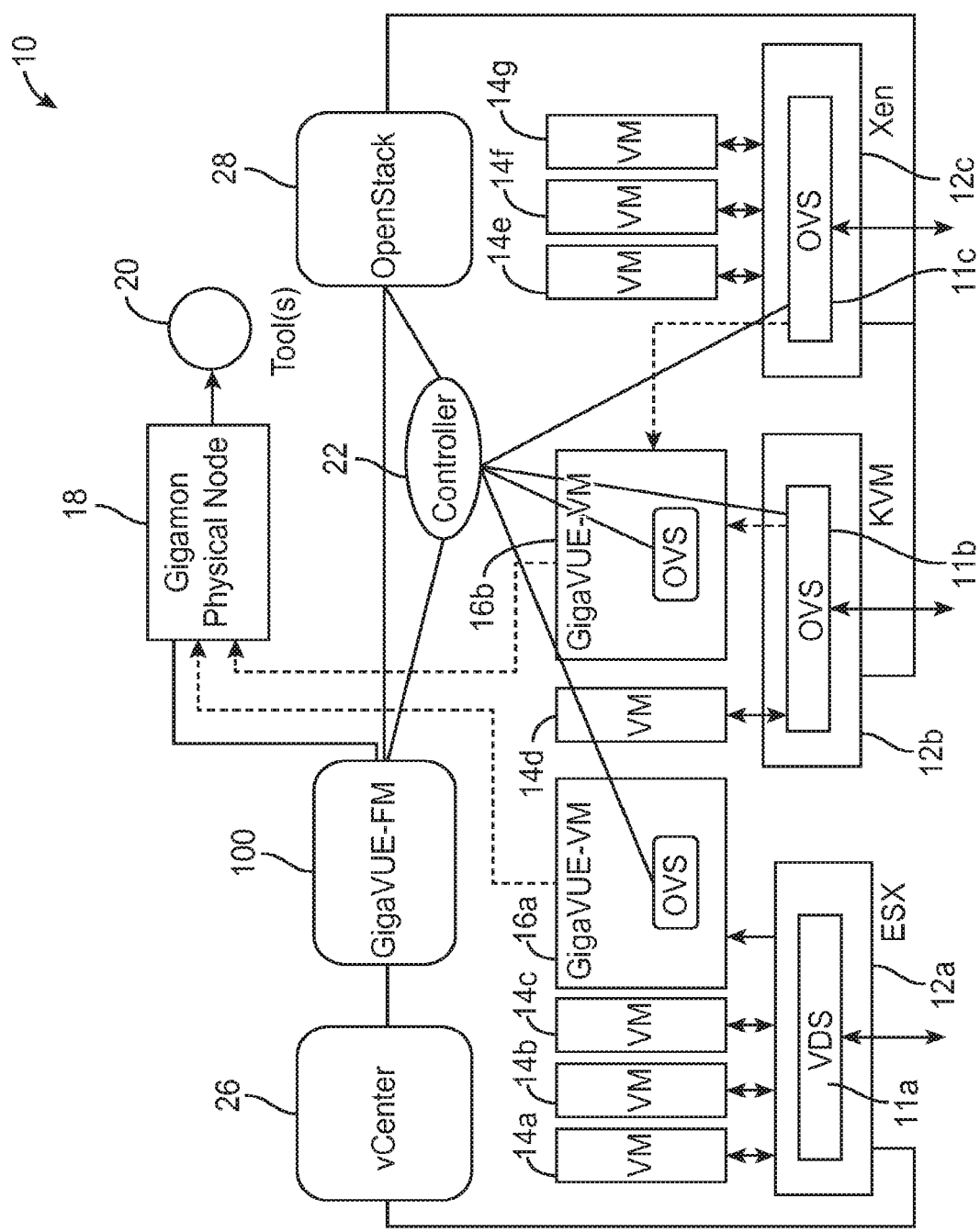
FIG. 2 illustrates another network in accordance with some embodiments.

It should be noted that the auxiliary network 10 is not limited to the example illustrated in FIG. 1, and that the auxiliary network 10 may have other configurations in other examples. For example, as shown in FIG. 2, the auxiliary network 10 may include multiple virtual switches 11a-11c at multiple hosts 12a-12c. The virtual switch 11a is not a part of the auxiliary network 10. The virtual switches 11b, 11c are parts of the auxiliary network 10, and therefore they may be considered service nodes P0. As shown in the figure, the host 12a supports VMs 14a-14c, the host 12b supports VM 14d, and the host 12c supports VMs 14e-14g. However, the VMs 14 are not parts of the auxiliary network. The auxiliary network 10 may also include multiple VMs 16a, 16b. The VM 16a is associated with the host 12a, and the VM 16b is associated with the host 12b. Although one network device 18 is shown, in other examples, there may be multiple network devices 18, each of which configured to communicate with one or more tools 20.

FIG. 2 shows two examples of virtualization management layer (or infracture), one being vCenter 26 and the other being OpenStack 28. Although only one vCenter 26 and one openstack 28 are shown, in other examples, there may be multiple vCenters 26 and/or multiple openstacks 28. As shown in FIG. 2, there is a SDN controller 22, which communicates with various components in the network 10. The SDN controller 22 may communicate with virtual switch(es) 11 implemented at one or more of the hosts 12a, 12b, 12c, either directly, or indirectly through the vCenter 26 and/or the openstack 28. The SDN controller 22 may also communicate with the VMs 16a, 16b.

As discussed, the virtual switch 11, the VM 16, and the network device 18 are parts of an auxiliary network configured to obtain packets from a production network, and to pass packets to the tool(s) 20 for analysis. There are various paths for passing the packets downstream to the tool(s) 20. For example, in a first scenario, a packet may be transmitted by the virtual switch 11 to the VM 16, and then from the VM 16 to the network device 18. The network device 18 then passes the packet to the tool(s) 20. In a second scenario, a packet may be transmitted by the virtual switch 11 to the VM 16, and the VM 16 may then pass the packet directly to the tool(s) 20 without going through the network device 18. In a third scenario, the virtual switch 11 may pass the packet to the network device 18 without going through the VM 16, and the network device 18 then passes the packet to the tool(s) 20. In a fourth scenario, the virtual switch 11 may pass a packet directly to tool(s) 20 without going through the VM 16 and the network device 18.

Chain of Service Nodes

In accordance with some embodiments, the fabric manager 100 is configured to create a service chain connecting one or more of the nodes (e.g., P0, P1, P2). For example, in some embodiments, the service chain may include a P0 node representing the virtual switch 11, a P1 node representing the VM 16, and a P2 node representing the network device 18. The fabric manager 100 may create virtual links connecting some of nodes P0, nodes P1, and nodes P2 to create the service chain. The created service chain dictates which service node(s) in the auxiliary network packets are to traverse in order to reach certain tool(s) 20. Accordingly, the service chain controls the behavior of one or more of the service nodes in the auxiliary network so that packets extracted from the production network may be forwarded to the tool(s) 20 in a certain manner.

The service chain created by the fabric manager 100 is configured to control the behavior of the nodes P0, P1, P2, or any combination of the foregoing, that are parts of the auxiliary network. In particular, the virtual links prescribe how packets obtained from the traffic production network are to be processed and passed between nodes to reach one or more tools 20. For example, a virtual link connecting from a P0 node (representing a virtual switch 11) to a P1 node (representing a VM 16) would prescribe that packet from the virtual switch 11 is to be passed to the VM 16. A virtual link connecting from a P1 node to a P2 node (representing a network device 18) would prescribe that packet from the VM 16 is to be passed to the network device 18. Similarly, a virtual link connecting from a P0 node to a P2 node would prescribe that packet from the virtual switch 11 is to be passed to the network device 18 to bypass the VM 16. In addition, a virtual link connecting from a P0 node to a P3 node (representing a network monitoring tool) would prescribe that packet from the virtual switch 11 is to be passed directly to tool 20 without going through the VM 16 and the network device 18. In the illustrated embodiments, SDN principles may be employed by the fabric manager 100 for managing the service nodes.

In the illustrated embodiments, the fabric manager 100 provides control and policy decisions, and is responsible for defining the behavior and roles of the P0, P1 and P2 nodes (that constitute the distributed data plane). The actual service chain determination (which may involve determining the number of service nodes in the chain, their identities, and the links connecting the service nodes) is also performed by the fabric manager 100. Accordingly, the fabric manager 100 provides a centralized policy decision making, which leads to more efficient use of the individual service nodes within the overall software-defined visibility fabric.

In some cases, the fabric manager 100 may be implemented using software that is run on a device. By means of non-limiting examples, the device may be a computer, a laptop, a server, a tablet, an iPad, a phone, a network device, or any of other devices that is capable of performing communication.

Figure 3:
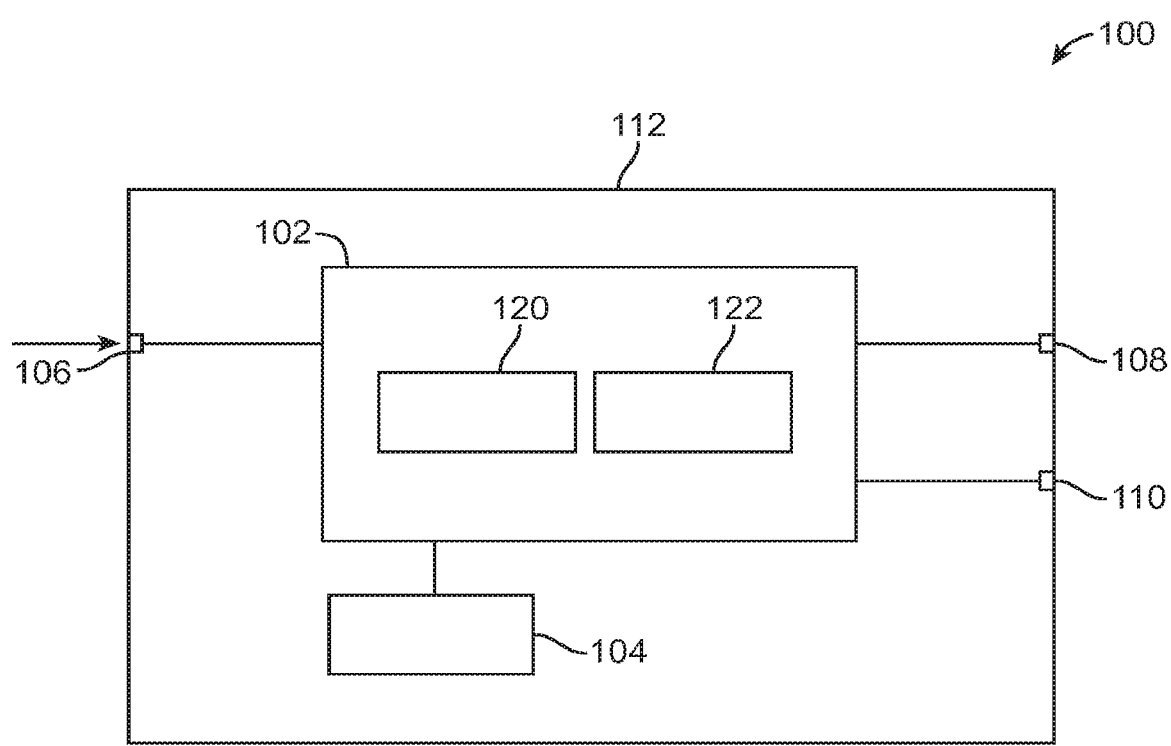
FIG. 3 illustrates a fabric manager that includes a service chain creation module in accordance with some embodiments.

An example of the fabric manager 100 will now be descried. FIG. 3 illustrates a block diagram of the fabric manager 100 in accordance with some embodiments. The fabric manager 100 includes a processing unit 102 and a non-transitory medium 104 communicatively coupled to the processing unit 102. The fabric manager 100 also includes a network interface 106 for receiving information from a user. In other cases, there may be multiple network interfaces 106 for receiving information from multiple users. The fabric manager 100 also includes a network interface 108 configured to communicate with a controller (e.g., the SDN controller 22), and a network interface 110 configured to communicate with a network device (e.g., the network device 18). Although only one network interface 108 and one network interface 110 are shown, in other examples, the fabric manager 100 may include multiple network interfaces 108 for communicating with multiple controllers 22, and/or multiple network interfaces 110 for communicating with multiple network devices 18. In other embodiments, two or more of the network interfaces 106, 108, 110 may be combined and be implemented as a single network interface. In the illustrated example, the processing unit 102 and the non-transitory medium 104 are accommodated in a housing 112 of the fabric manager 100. The housing 112 allows the fabric manager 100 to be carried, transported, sold, and/or operated as a single unit. Alternatively, the non-transitory medium 104 may be external to the housing 112. For example, the non-transitory medium 104 may be one or more storages/databases that are communicatively coupled to the processing unit 102. The network interfaces 106, 108, 110 are located at a periphery of the housing 112. In other embodiments, the network interfaces 106, 108, 110 may be located at other locations relative to the housing 112.

The processing unit 102 may be implemented using an integrated circuit, such as a processor. A processor may be a general processor, a network processor, an ASIC processor, a FPGA processor, etc. In other embodiments, the processing unit 102 may be a field processor. In further embodiments, the processing unit 102 may be a network card. In some cases, the processing unit 102 may be implemented using hardware, software, or a combination of both.

As shown in the figure, the processing unit 102 includes a user interface module 120 configured to provide a user interface for allowing a user of the fabric manager 100 to enter inputs. The processing unit 102 also includes a service chain creation module 122 configured to create a service chain based on certain criteria. In some cases, the criteria may be implemented in the processing unit 102 during a manufacturing process. In other cases, the criteria may be input (e.g., via the network interface 106) by an administrator of the fabric manager 100. In further cases, the criteria may be input a user (e.g., via the network interface 106).

The non-transitory medium 104 is configured to store information regarding various network components that may be linked by a service chain created using the processing unit 102. In some cases, the stored information may include identities of a plurality of service nodes (e.g., P0 nodes, P1 nodes, P2 nodes, etc.) representing different respective network components. In the illustrated embodiment, the service nodes are organized into different respective categories of nodes that include at least a first category of service nodes, a second category of service nodes, and a third category of service nodes. For example, the service node P0 in the first category of nodes represents a virtual switch 11, the service node P1 in the second category of nodes represents a virtual machine (e.g., VM 16), and the service node P2 in the third category of nodes represents a network device (e.g., network device 18, which may be a network switch appliance configured to communicate with one or more network monitoring tools). Information regarding the different categories of nodes are stored in the non-transitory medium 104. Also, in the illustrated embodiment, the P0 service nodes in the first category are configured to provide a first category of services, the P1 service nodes in the second category are configured to provide a second category of services, and the P2 service nodes in the third category are configured to provide a third category of services. Information regarding the different categories of services are also stored in the non-transitory medium 104. In the illustrated embodiment, each of the service nodes P0, P1, P2 represents a network component that can filter, manipulate, and dispatch network packets. However, the complexity of these tasks increases from P0 to P1 to P2. Accordingly, P0 node has higher packet processing efficiency than P1 node, and P1 node has higher packet processing efficiency than P2 node. However, P2 node has higher packet processing intelligence than P1 node, and P1 node has higher packet processing intelligence than P0 node. Information regarding packet processing efficiency and packet processing intelligence for the different nodes or categories of nodes may be stored in the non-transitory medium 104.

In some cases, the user interface module 120 is configured to provide a user interface for allowing a user of the fabric manager 100 to enter service node information. The created service node information may then be stored in the medium 104. By means of non-limiting examples, the service node information may include service node identity, service node category, type of network component represented by the service node, identity of network component represented by the service node, type of services provided by the network component represented by the service node, functionalities of the network component, etc., or any combination of the foregoing. In other cases, the fabric manager 100 may obtain the service node information from one or more network devices.

After the service node information has been obtained by the fabric manager 100, the fabric manager 100 may then create a service chain connecting some of the service nodes. In some cases, the service chain creation module 122 may be configured to automatically generate one or more links to connect certain service nodes based on one or more predefined criteria. For example, the user may enter input prescribing certain functions be performed on a packet. In such cases, the service chain creation module 122 may automatically select certain service nodes and automatically create one or more links to connect them so that the service chain of service nodes will provide the required functionalities indicated by the user input.

In other cases, instead of configuring the fabric manager 100 to automatically create a service chain, a user can use the interface provided by the user interface module 120 to enter link information and to identify the service nodes to be connected by a link. The service chain creation module 122 of the processing unit 102 then associates the created link with the two nodes, and passes them to the medium 104 so that the link information may be stored in association with the service node information regarding the two service nodes connected by the link.

Figure 4:
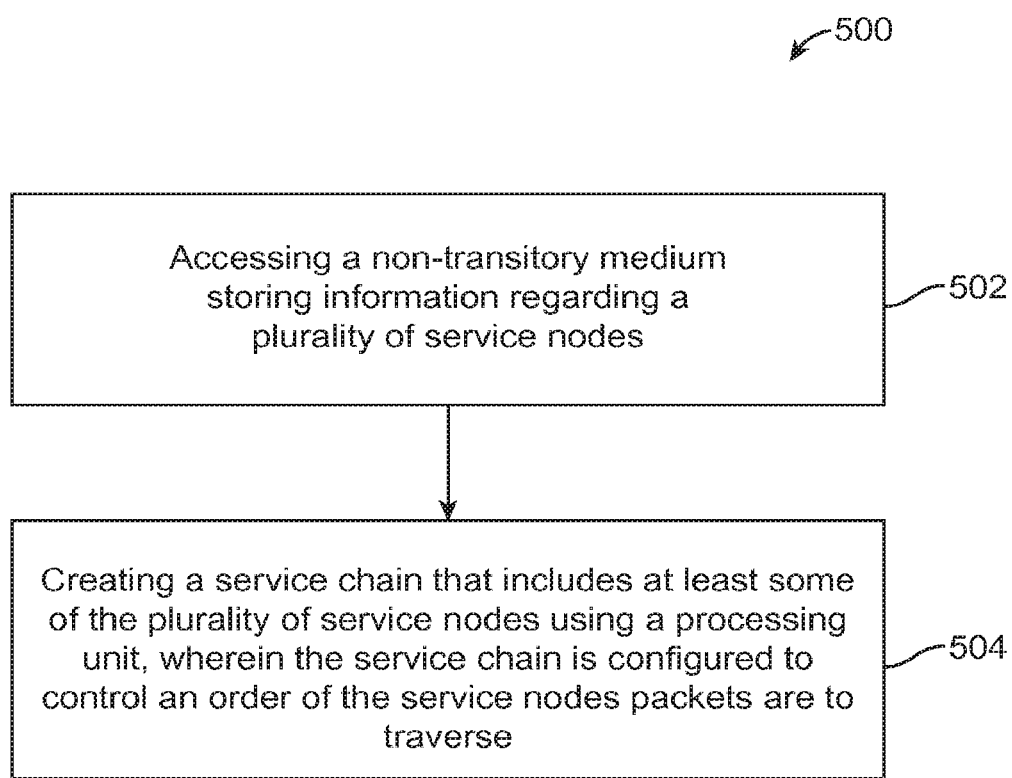
FIG. 4 illustrates a method of creating a service chain of service nodes in accordance with some embodiments.

FIG. 4 illustrates a method 500 of creating a service chain using the fabric manager 100. First, the processing unit 102 of the fabric manager 100 accesses the non-transitory medium 104 that stores information regarding a plurality of service nodes (item 502). For example, the medium 104 may store information regarding P0 service node, P1 service node, and P2 service node. In such cases, item 502 may be performed by the processing unit 102 that accesses the non-transitory medium 104 storing these information.

Next, the processing unit 102 of the fabric manager 100 creates a service chain that includes at least some of the plurality of service nodes (item 504). In some cases, the processing unit is configured to create virtual links to connect some of the service nodes to create the service chain. For example, the creation of the service chain may be performed automatically by the processing unit based on certain algorithm that considers processing efficiency and processing complexity (or intelligence). In other cases, the processing unit 102 may create the service chain in response to a user input that prescribes certain service nodes are to be connected by the virtual links. In other cases, the service chain may be automatically created based on one or more criteria provided by the user. For example, the user may enter input prescribing certain services (e.g., types of services, level of services) to be performed on a packet. A service may involve packet manipulation, filtering, forwarding, or any combination of the foregoing. In such cases, the processing unit 102 may automatically select certain nodes to be connected by the links so that the user-prescribed criteria is met. The service chain is configured to control an order of network components (represented by the service nodes) in the auxiliary network packets are to traverse. In some cases, the created service chain governs the behavior of various network components represented by the service nodes so that packets may be transmitted downstream in a certain manner for processing by one or more tools.

Overlay Technique

In some embodiments, overlay technique may be employed by the fabric manager 100 to implement service chain(s) for the auxiliary network. For example, the service chain creation module 122 in the fabric manager 100 may include an overlay module that uses an overlay technique to create an auxiliary network for a certain user. In such cases, the overlay module is configured to provide multiple overlays for different respective users. For example, overlay module in the fabric manager 100 may apply a first overlay to connect a first set of service nodes (e.g., P0 service node(s), P1 service node(s), P2 service node(s), or any combination of the foregoing) in the auxiliary network for a first user (e.g., an owner of a network monitoring tool). The overlay module in the fabric manager 100 may also apply a second overlay to connect a second set of service nodes in the auxiliary network for a second user (e.g., an owner of a network monitoring tool). The service nodes in the first set may all be the same as those in the second set, all different from those in the second set, or may have a subset that is the same as that in the second set. Accordingly, using the overlay technique, a certain service node in the auxiliary network may be a part of different service chains for different users. However, packets associated with the respective overlays remain isolated from each other, and also isolated from the traffic production network.

Flexibility of Service Chain

The service chain is flexible in the sense that it can be modified and/or scaled by the fabric manager 100. For examples, one or more service nodes may be added to the service chain, one or more service nodes may be removed from the service chain, etc.

Figure 5A:
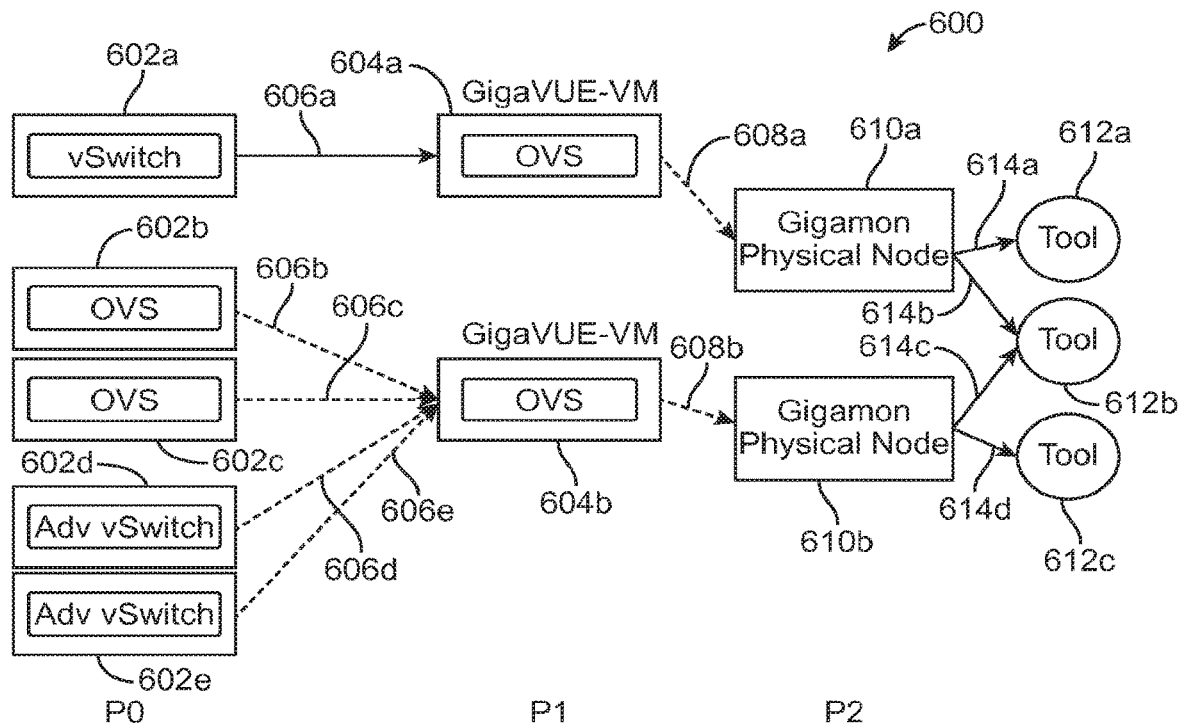
FIGS. 5A-5I illustrates different examples of a service chain.

FIG. 5A illustrates an example of a service chain 600 that may be created by the fabric manager 100 to implement an auxiliary network. As shown in the figure, the service chain 600 includes multiple P0 nodes 602a-60260e connected to multiple P1 nodes 604a-604b via virtual links 606a-606e. In particular, the link 606a prescribes network traffic from the P0 node 602a to be transmitted to P1 node 604a for processing, and the links 606b-606e prescribe network traffic from the P0 nodes 602b-602e, respectively, to be transmitted to P1 node 604b for processing. The service chain 600 also includes multiple virtual links 608a-608b connecting the P1 nodes 604a-604b to P2 nodes 610a-610b. In particular, the link 608a prescribes network traffic from the P1 node 604a to be transmitted to P2 node 610a for processing, and the link 608b prescribes network traffic from the P1 node 604b to be transmitted to P2 node 610b for processing. The service chain 600 also includes multiple links 614a-614d connecting the P2 nodes 610a, 610b to tools 612a-612c. The links 614a, 614b indicate that network traffic from the P2 node 610a is to be processed by the tools 612a, 612b. The links 614c, 614d indicate that network traffic from the P2 node 610b is to be processed by the tools 612b, 612c.

Although the service chain 600 is illustrated as having five P0 nodes 602, two P1 nodes 604, two p2 nodes 610, and three tools 612, in other examples, the service chain 600 may have more than five P0 nodes 602 or fewer than five P0 nodes 602, more than two P1 nodes 604 or fewer than two P1 nodes 604, more than two P2 nodes 610 or fewer than two P2 nodes 610, and/or more than three tools 612 or fewer than three tools 612.

In the illustrated example, the P0 nodes 602 represent a first category of network components (e.g., the virtual switch 11), the P1 nodes 604 represent a second category of network components (e.g., the VM 16), and the P2 nodes 610 represent a third category of network components (e.g., the physical network device 18). In some cases, the network device represented by the P2 node 610 may be a switch appliance configured to pass packets to one or more tools, such as the tool(s) 612. It should be noted that the network components represented by the P0 nodes 602, the P1 nodes 604, and the P2 nodes 610 are not limited to the above examples.

Figure 5B:
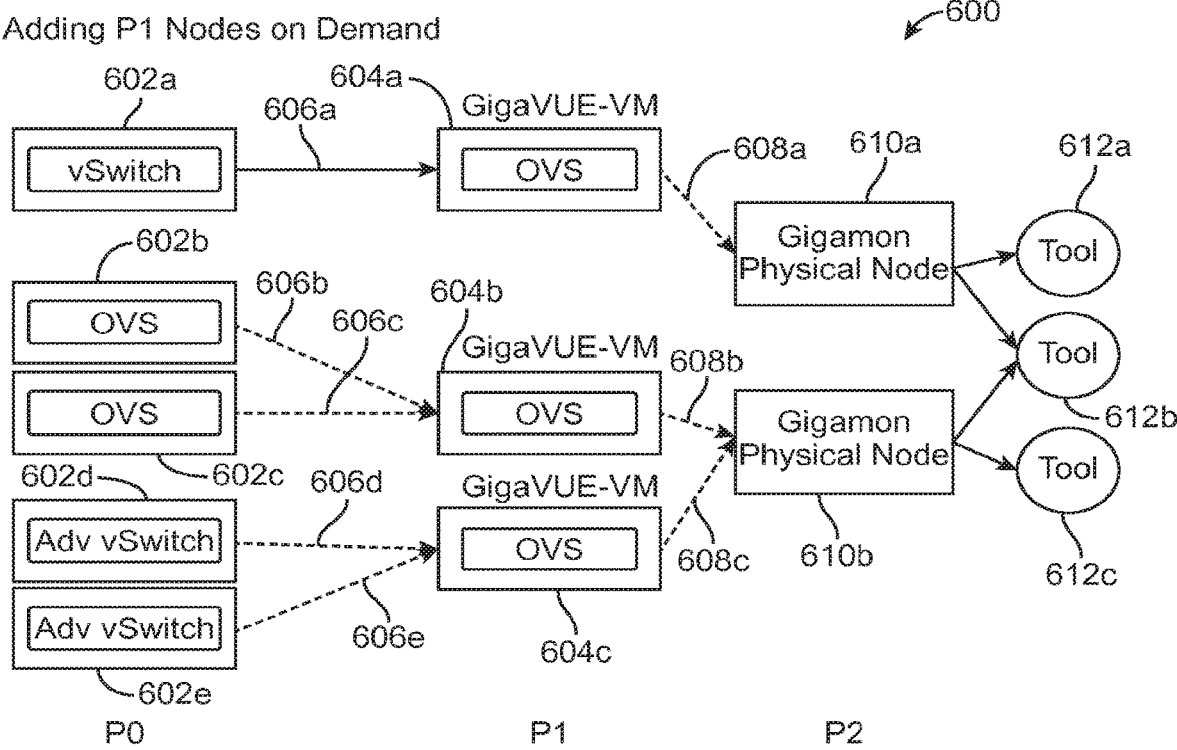

In some cases, the fabric manager 100 may be operated (e.g., based on input from a user) to add a node to the service chain 600. FIG. 5B illustrates an additional P1 node 604c added to the service chain 600 of FIG. 5A. Such configuration is advantageous because it allows the workload previously handled by the P1 node 604b to be distributed between two P1 nodes 604b, 604c. In some cases, the fabric manager 100 may add the P1 node 604c to the service chain 600 by including the P1 node 604c as part of the service chain 600, and by changing the links 606d, 606e so that they are connected between the P0 nodes 602d, 602e and the P1 nodes 604c. Also, a new virtual link 608c may be created by the fabric manager 100 to connect the newly added P1 node 604c to the P2 node 610b. The modified service chain 600 may then be stored in a non-transitory medium. For example, in some cases, information regarding the P0 nodes 602, P1 nodes 604, and P2 nodes 610, and information regarding the links 606 and the links 608 may be stored in the non-transitory medium. In the above example, the service chain 600 is illustrated as being modified by adding a P1 node. In other examples, the service chain 600 may be modified by the fabric manager 100 by adding one or more P0 nodes, one or more P1 nodes, one or more P2 nodes, or any combination of the foregoing.

Figure 5C:
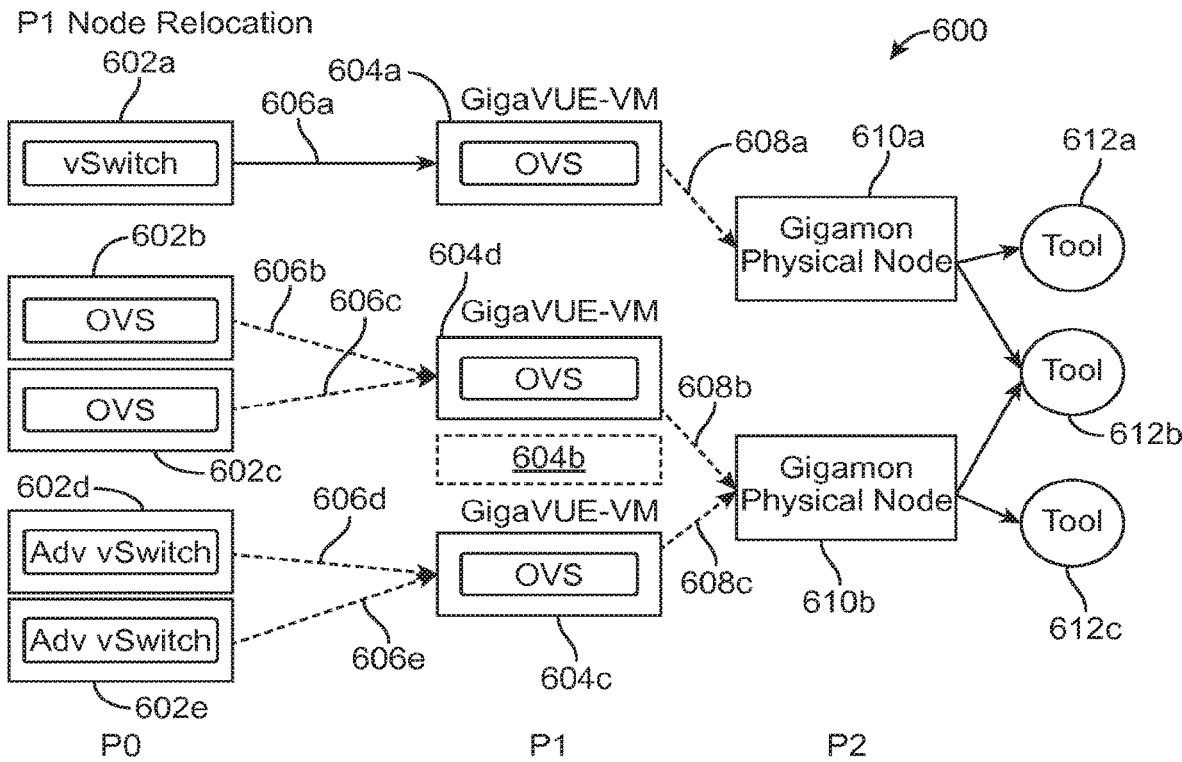

In some cases, the fabric manager 100 may be operated (e.g., based on input from a user) to relocate a node in the service chain 600. FIG. 5C illustrates the same service chain 600 of FIG. 5B, except that P1 node 604*b* has been relocated to new P1 node 604*d*. Such configuration is advantageous because it allows the P1 node 604*b* to be disconnected from the service chain 600 if the network component(s) associated with the P1 node 604*b* is unavailable, e.g., due to service, maintenance, malfunction, etc. In some cases, the fabric manager 100 may add the P1 node 604*d* to the service chain 600 by including the P1 node 604*d* as part of the service chain 600, and by changing the links 606*b*, 606*c* so that they are connected between the P0 nodes 602*b*, 602*c* and the new P1 node 604*d*. Also, the virtual link 608*b* is changed so that it is connected between the P1 node 604*d* and the P2 node 610*b*. The modified service chain 600 may then be stored in a non-transitory medium. For example, in some cases, information regarding the P0 nodes 602, P1 nodes 604, and P2 nodes 610, and information regarding the links 606 and the links 608 may be stored in the non-transitory medium. In the above example, the service chain 600 is illustrated as being modified by relocating a P1 node. In other examples, the service chain 600 may be modified by the fabric manager 100 by relocating one or more P0 nodes, one or more P1 nodes, one or more P2 nodes, or any combination of the foregoing.

Figure 5D:
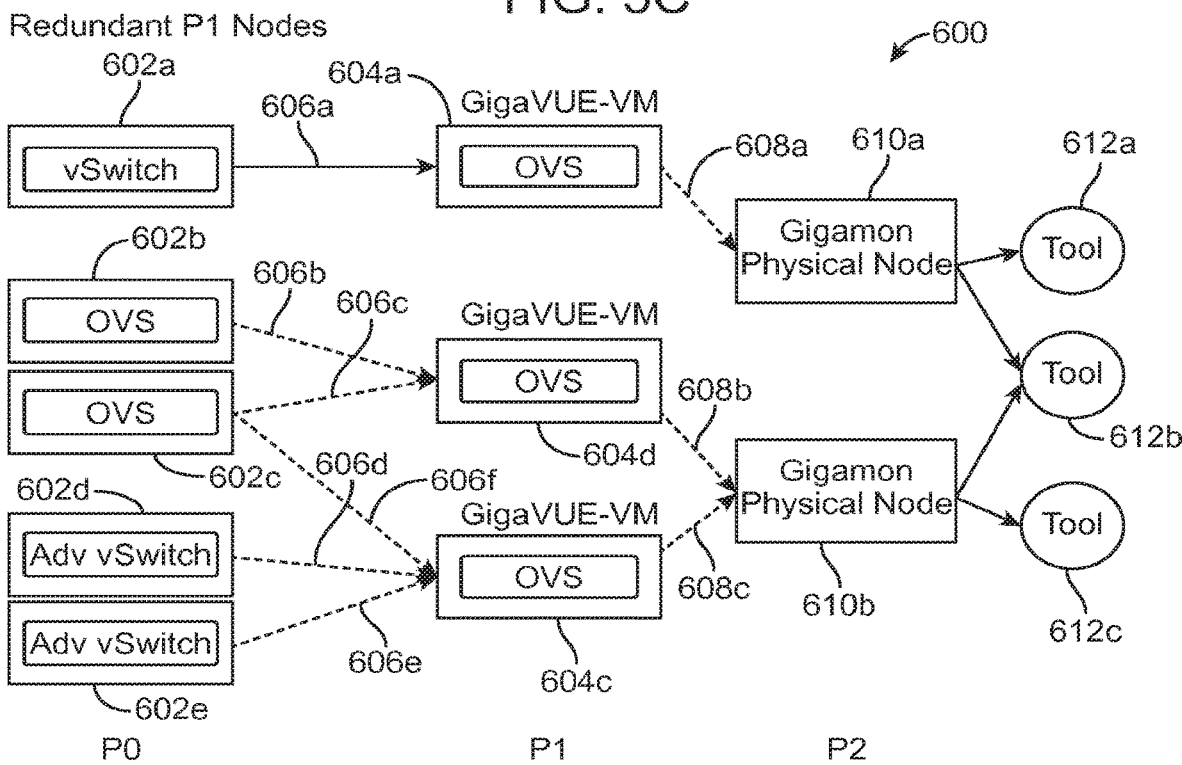
Figure 5E:
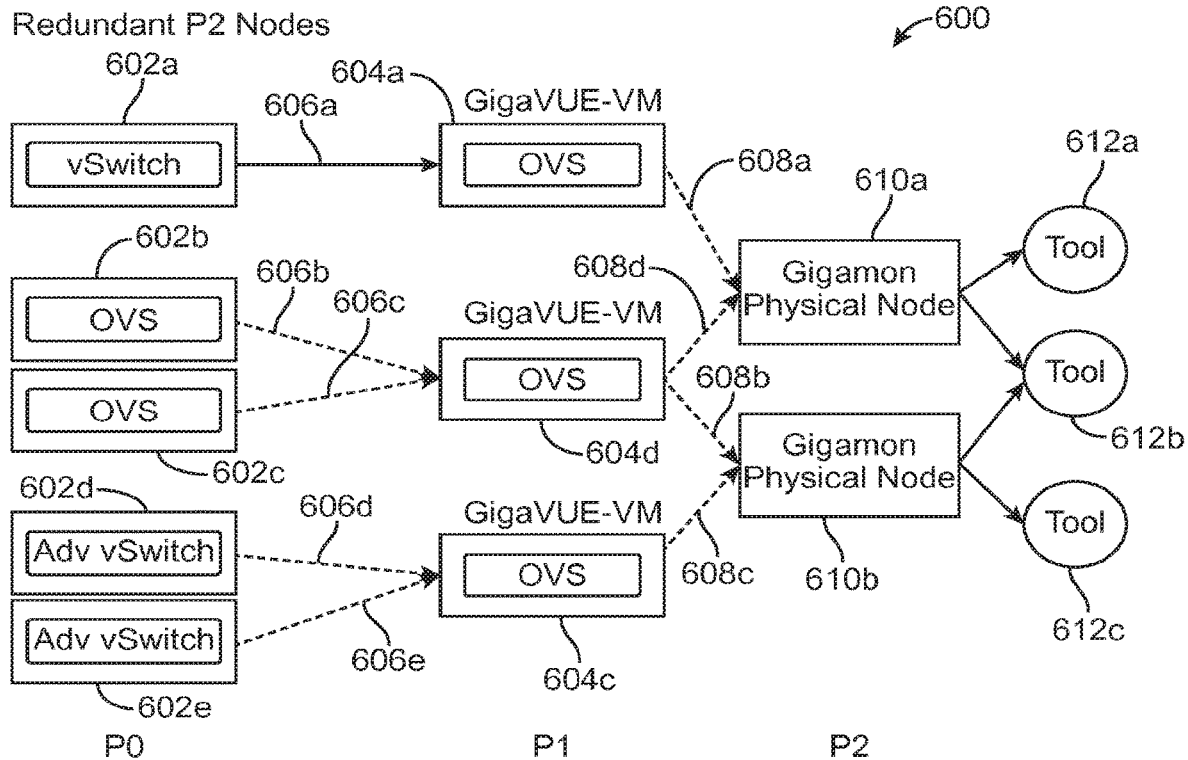
Figure 5F:
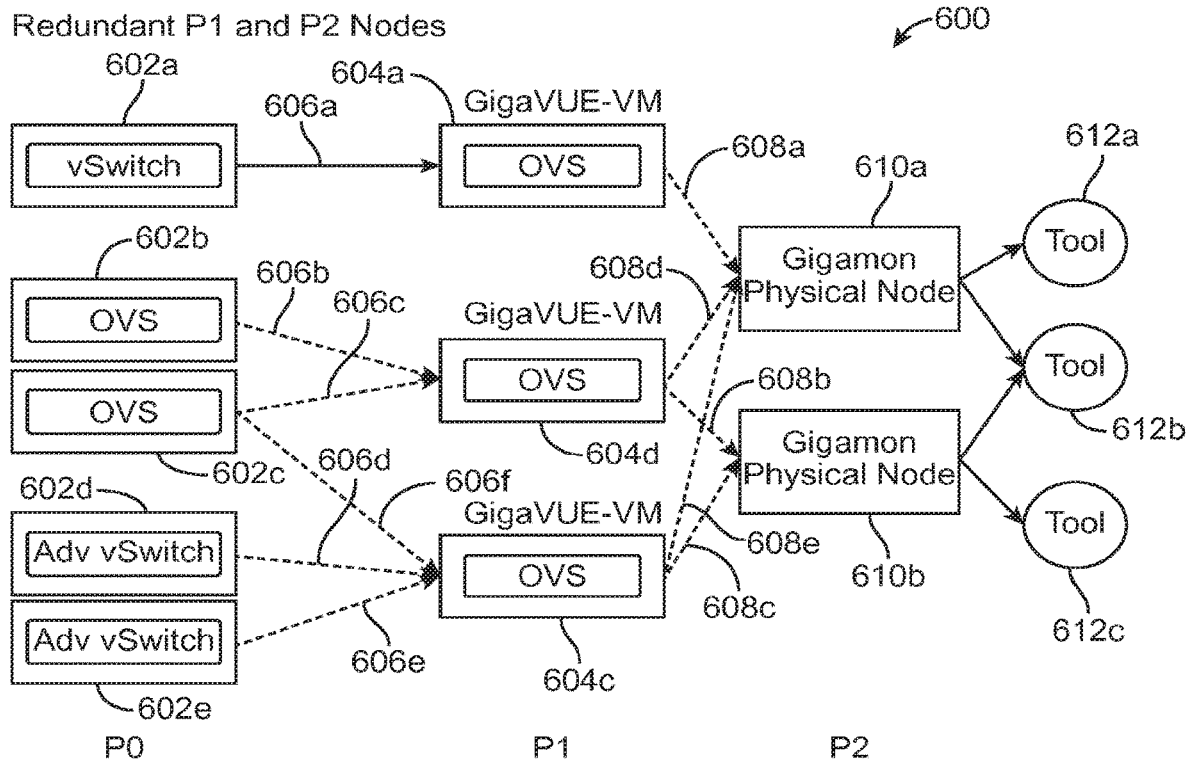

In some cases, the fabric manager 100 may be operated (e.g., based on input from a user) to provide redundant node(s) in the service chain 600. FIG. 5D illustrates the same service chain 600 of FIG. 5C, except that a new virtual link 606*f* is added by the fabric manager 100 to connect the P0 node 602*c* to the P1 node 604*c*. Such configuration is advantageous because it allows both the P1 node 604*d* and the P1 node 604*c* to be connected to the same P0 node 602*c*, so that network traffic from the P0 node 602*c* can be processed by both p1 nodes 604*c*, 604*d*. In some cases, the P1 nodes 604*c*, 604*d* may process the same network traffic from the P0 node 602*c*. In other cases, the P1 nodes 604*c*, 604*d* may process different network traffic from the P0 node 602*c*. The modified service chain 600 may then be stored in a non-transitory medium. For example, in some cases, information regarding the P0 nodes 602, P1 nodes 604, and P2 nodes 610, and information regarding the links 606 and the links 608 may be stored in the non-transitory medium. In the above example, the service chain 600 is illustrated as having two P1 nodes 604 connecting to the same P0 602 node. In other examples, the service chain 600 may be have more than two P1 nodes 604 connecting to the same P0 node 602, two or more P2 nodes 610 connecting to the same P1 node 604 (such as that shown in the example of FIG. 5E), or any combination of the foregoing (such as that shown in the example of FIG. 5F). In particular, the example shown in FIG. 5E is the same as that shown in FIG. 5F, except that a new virtual link 608*d* is added to the service chain 600 by the fabric manager 100. Such configuration allows packet from the P1 node 604*d* be transmitted to P2 node 610*a* and P2 node 610*b* for processing. The example shown in FIG. 5F is the same as that shown in FIG. 5D, except that there are two virtual links 808*b*, 808*d* connecting the P1 node 604*d* to the P2 nodes 610*a*, 610*b* to provide redundancy processing for the P1 node 604*d*, and that there are two virtual links 608*c*, 608*e* connecting the P1 node 604*c* to the P2 nodes 610*a*, 610*b* to provide redundancy processing for the P1 node 604*c*.

Figure 5G:
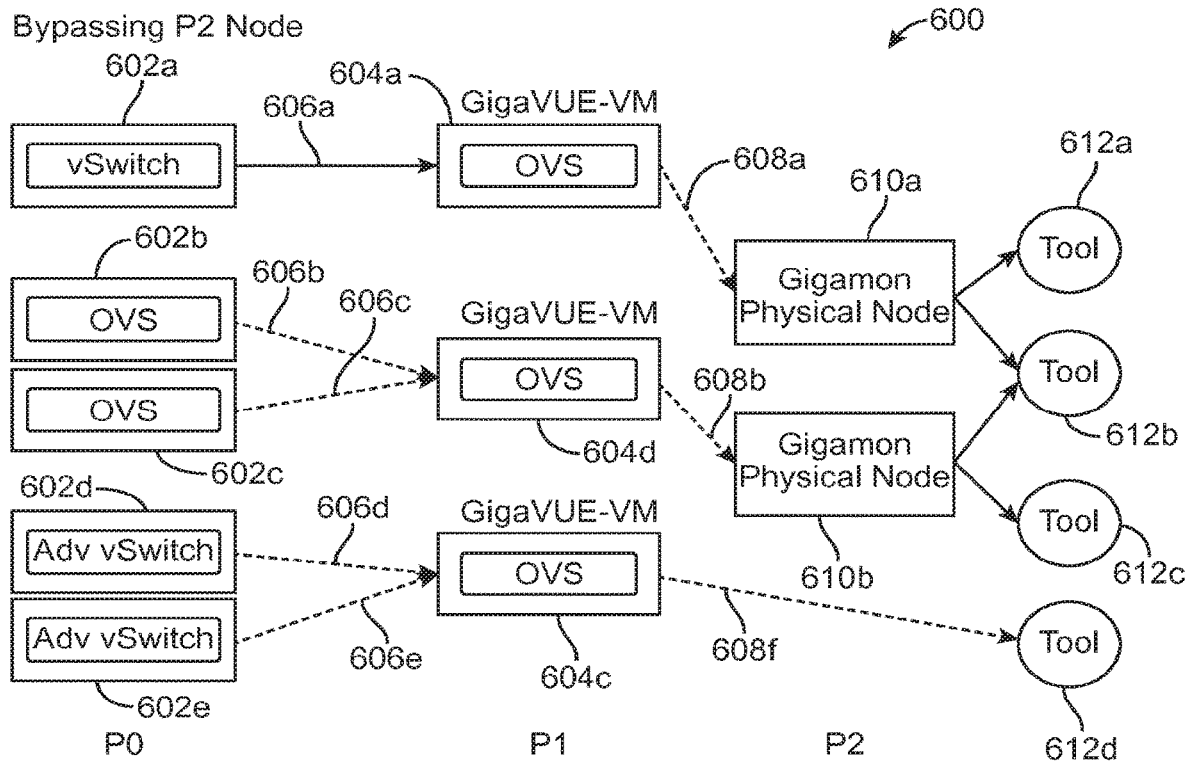
Figure 5H:
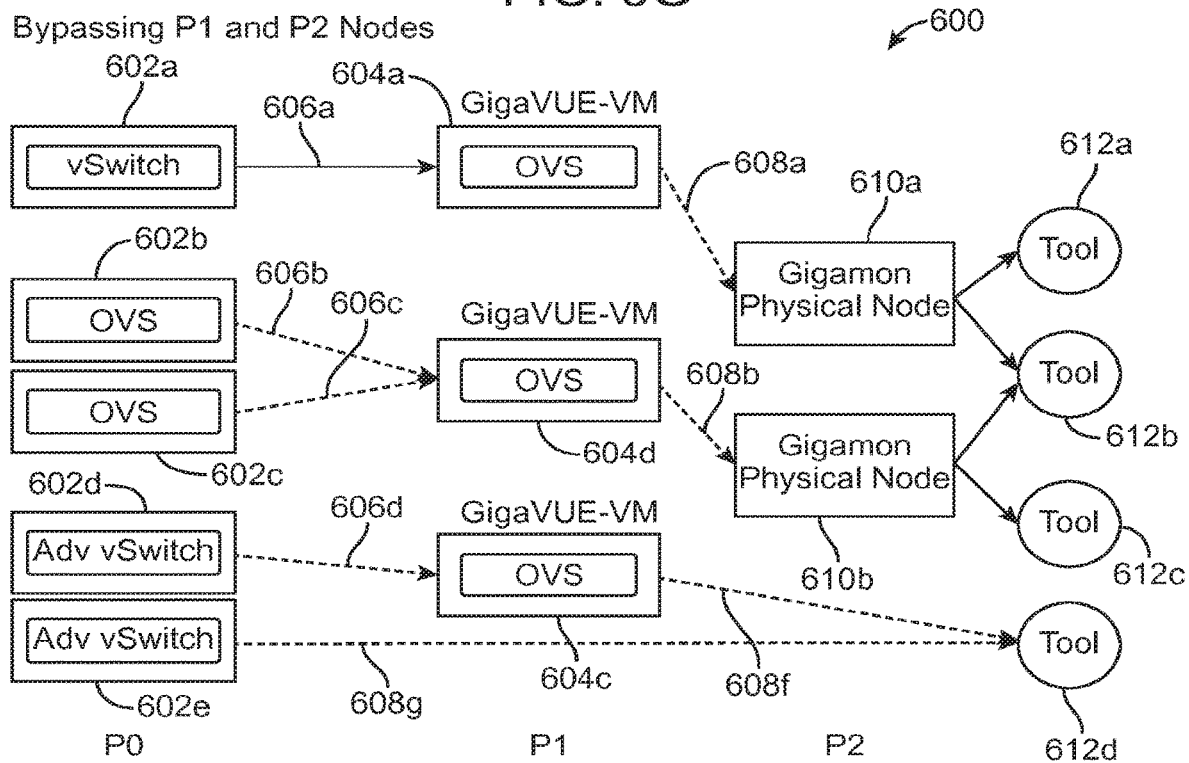

In some cases, the fabric manager 100 may be operated (e.g., based on input from a user) to bypass one or more node(s) in the service chain 600. FIG. 5G illustrates the same service chain 600 of FIG. 5E, except that the link 608*c* connecting the P1 node 604*c* to the P2 node 610*b* has been removed by the fabric manager 100, and the fabric manager 100 has added virtual link 608*f* connecting the P1 node 604*c* directly to tool 612*d*. Such configuration may be advantageous in situation in which processing by a P2 node 610 is not necessary, so network traffic may be passed from the P1 node 604 to the tool 612 directly. The modified service chain 600 may then be stored in a non-transitory medium. For example, in some cases, information regarding the P0 nodes 602, P1 nodes 604, and P2 nodes 610, and information regarding the links 606 and the links 608 may be stored in the non-transitory medium. In the above example, the service chain 600 is illustrated as having the link 608*f* connecting the P1 node 604*c* and the tool 612*d* to bypass the P2 nodes 610. In other examples, the service chain 600 may have one or more links connecting one or more P0 nodes 602 to one or more P2 nodes 610 to bypass the P1 nodes 604. In further examples, the service chain 600 may be have one or more links (such as the link 608*g* shown in the example of FIG. 5H) connecting one or more P0 nodes 602 to one or more tools 612 to bypass the P1 nodes 604 and the P2 nodes 610. The configuration of FIG. 5H may be advantageous in situation in which processing by a P1 node 604 and a P2 node 610 is not necessary, so network traffic may be passed from the P0 node 602 to the tool 612 directly.

Figure 5I:
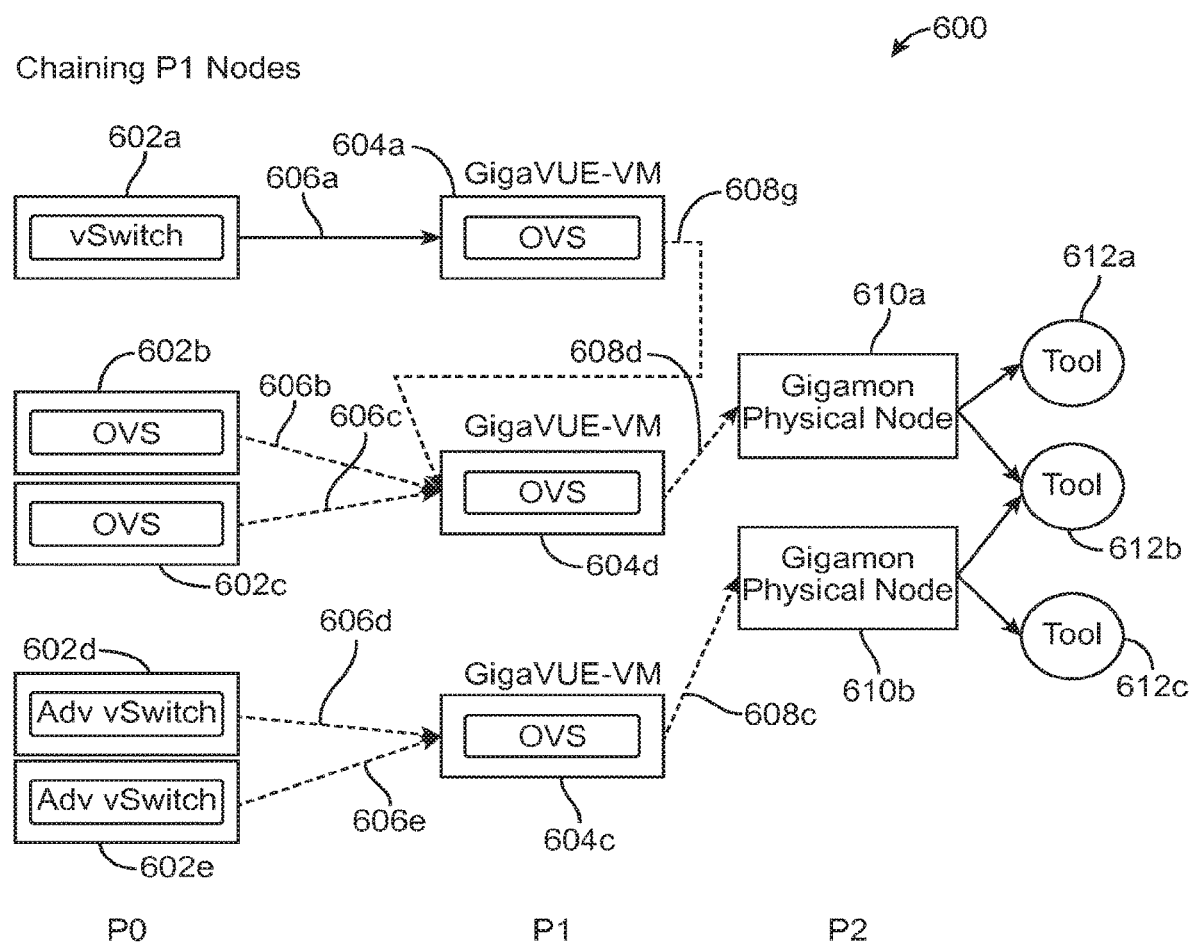

In some cases, the fabric manager 100 may be operated (e.g., based on input from a user) to chain multiple P1 nodes 604 in the service chain 600. FIG. 5I illustrates a service chain 600 that is similar to that of FIG. 5E, except that the link 608*a* connecting the P1 node 604*a* to the P2 node 610*a* has been removed by the fabric manager 100, and the fabric manager 100 has added virtual link 608*g* connecting the P1 node 604*a* directly to the P1 node 604*d* to create a chain/series of P1 nodes 604. Such configuration allows network traffic to be sequentially processed by two P1 nodes 604. The modified service chain 600 may then be stored in a non-transitory medium. For example, in some cases, information regarding the P0 nodes 602, P1 nodes 604, and P2 nodes 610, and information regarding the links 606 and the links 608 may be stored in the non-transitory medium. In the above example, the service chain 600 is illustrated as having the link 608*g* connecting two P1 nodes 604 in a series. In other examples, the service chain 600 may have multiple links connecting more than two P1 nodes 604 in series. Also, in other examples, the service chain 600 may have one or more links connecting two or more P0 nodes 602 in a series, one or more links connecting two or more P1 nodes 604 in a series, one or more links connecting two or more P2 nodes 610 in a series, or any combination of the foregoing.

As illustrated in the above examples, the fabric manager 100 is advantageous because it can create a service chain 600 by connecting different categories of nodes (e.g., P0 node(s), P1 node(s), P2 node(s), etc.). The different categories of nodes represent network components that provide different respective categories of services. For example, P0 nodes 602 may provide a first category of service, and P1 nodes 604 may provide a second category of service that is different from (e.g., more advance than) the first category of service of the P0 nodes 602. Similarly, P2 nodes 610 may provide a third category of service that is different from (e.g., more advance than) the first category of service of the P0 nodes 602 and the second category of service of the P1 nodes 604. Thus, if the fabric manager 100 determines that the service (functionality) of the P2 node 610 is not needed, then the fabric manager 100 may create virtual link in the service chain 600 to bypass the P2 node 610. Similarly, if the service (functionality) of the P1 node 604 is not needed, then the fabric manager 100 may create virtual link in the service chain 600 to bypass the P1 node 604.

As discussed, the fabric manager 100 may be configured to create a service chain connecting one or more of the nodes (e.g., P0, P1, P2). The created service chain dictates which service node(s), and the order of the service node(s), in the auxiliary network packets are to traverse in order to reach certain tool(s) 20. Accordingly, the service chain controls the behavior of one or more of the service nodes in the auxiliary network so that packets may be forwarded to the tool(s) 20 in a certain manner. The creation of the service chain can be performed automatically by the fabric manger 100. In some cases, the fabric manger 100 may create the service chain based on certain user input. For example, a user may enter service node information and/or service criteria through a user interface, and the fabric manager 100 may create a service chain connecting some of the service nodes based in the user input. In some cases, the service criteria entered by the user may include an identification of a service, such as a type of service and/or a level of service. A service may be packet manipulation, packet filtering, packet forwarding, or any combination of the foregoing.

As discussed, a user may enter service node information for the fabric manager 100. In other cases, the fabric manager 100 may be configured to obtain service node information from one or more network devices. For example, such may be accomplished by the fabric manager 100 communicating with the SDN controller 22, the vCenter 26, the openstack 28, or any combination of the foregoing. The fabric manager 100 may also communicate directly with the hosts 12a-12c, directly with the VMs 16a-16b, and/or directly with the network device 18. By means of non-limiting examples, the information regarding the network 10 obtained by the fabric manager 100 may include identities of the virtual switch(s) 11, locations of the virtual switch(s) 11, states of the virtual switch(s) 11, protocols used by the virtual switch(s) 11, network processing policies used by the virtual switch(s) 11, information stored in association with the virtual switch(s) 11, or any combination of the foregoing. The information may also include identities of the VMs 16, locations of the VMs 16, states of the VMs 16, protocols used by the VMs 16, network processing policies used by the VMs 16, applications running on the VMs 16, information stored at the VMs 16 or in association with the VMs 16, or any combination of the foregoing. The information may also include identity of the network device 18, location of the network device 18, state of the network device 18, protocol used by the network device 18, network processing policy used by the network device 18, applications running on the network device 18, information stored at the network device 18 or in association with the network device 18, or any combination of the foregoing. The information may also include a mapping between a virtual machine host and a virtual machine workload, or any combination of the foregoing. In some embodiments, the information may be a mapping between an outer header (e.g., the addresses of the source and/or destination VM hosts) and inner header (e.g., the addresses of the actual VM) of a packet that has a tunnel format, wherein the outer header may be due to an encapsulation of an original packet resulted from virtualization technology.

Packet Processing Efficiency Vs. Packet Processing Intelligence

In some cases, the processing unit 102 in the fabric manager 100 may be configured to balance packet processing efficiency and service intelligence when creating the service chain. For example, if a user desires higher processing efficiency and does not mind lower processing capabilities, then the processing unit 102 may select the service node (e.g., P0 service node) that will provide the highest efficiency while still meeting the minimum processing capabilities. On the other hand, if the user desires higher processing capabilities and does not care as much about efficiency, then the processing unit 102 may select the service node (e.g., P2 service node) that will provide the highest processing capabilities. Also, in some cases, the processing unit 102 (e.g., the service chain creation module 122 of the processing unit 102) may be configured to determine the shortest possible or the most efficient service chain. The more expensive (higher numbered) service nodes, such as P2 service nodes, are included only when the added benefits provided by them are required. In this way the service chain creation module 122 of the processing unit 102 is constantly trying to balance packet processing efficiency versus packet processing intelligence.

In the illustrated embodiment, the P1 node 604 represents a network component that performs more complicated network traffic processing (e.g., higher processing intelligence) compared to the P0 node 602. Also, the P2 node 610 represents a network component that performs more complicated network traffic processing (e.g., higher processing intelligence) compared to the P1 node 604. Accordingly, the P0 node is more efficient in packet processing compared to the P1 node, and the P1 node is more efficient in packet processing compared to the P2 node. In some embodiments, the service chain creation module 122 is configured to consider processing efficiency and processing intelligence when creating the service chain 600. For example, the service chain creation module 122 in the fabric manager 100 may balance processing efficiency and processing intelligence when selecting which type of nodes (e.g., P0 node, P1 node, P2 node, etc.) to include in the service chain 600.

Figure 6A:
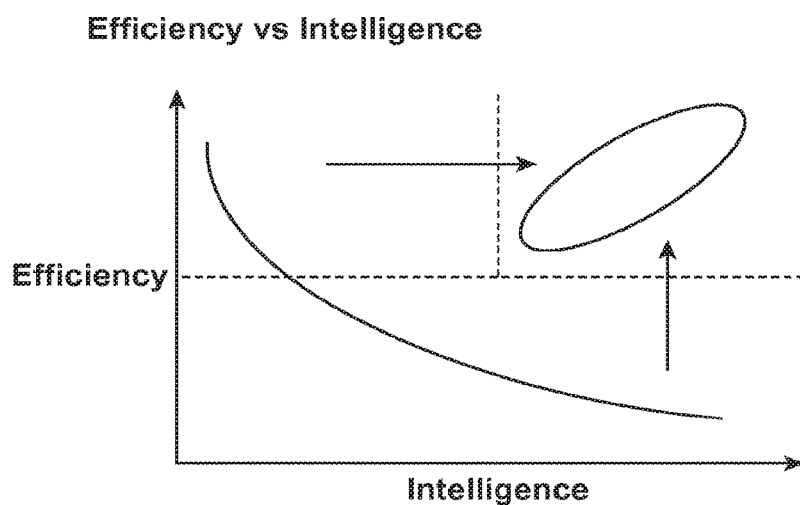
FIG. 6A illustrates network processing efficiency versus network processing intelligence.
Figure 6B:
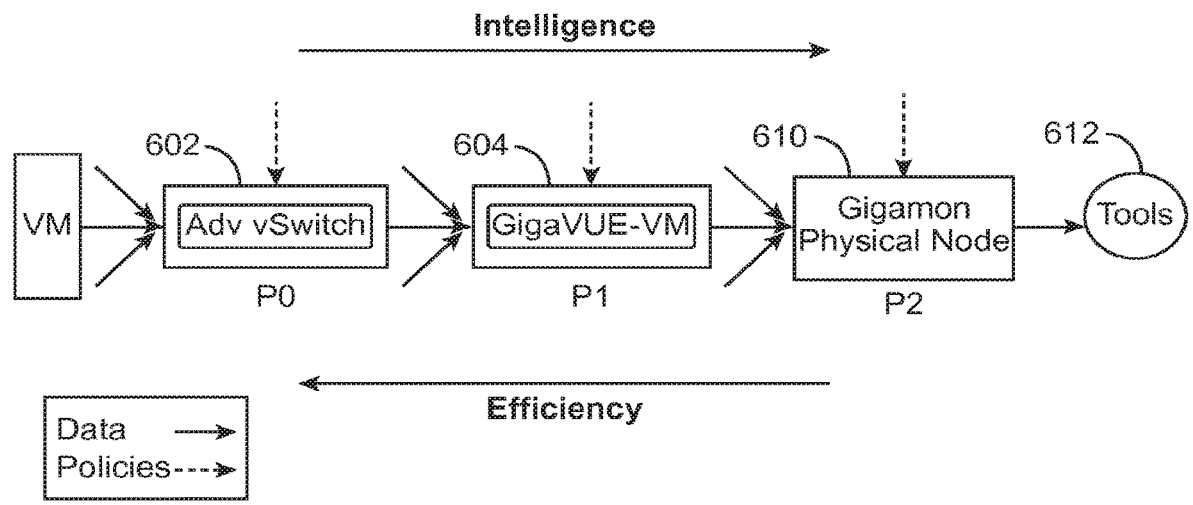
FIG. 6B illustrates network processing efficiency and network processing intelligence for different network components in a network.

FIG. 6A illustrates a graph, showing processing efficiency being inversely related to processing intelligence. As shown in the figure, higher processing intelligence may require more processing resource (e.g., time, memory, etc.), and so the corresponding processing efficiency is lower. FIG. 6B illustrates processing efficiency and processing intelligence as functions of the different types of nodes. Since P2 nodes 610 provide higher processing intelligence (e.g., it can perform more complicated packet filtering, packet manipulation, packet forwarding, etc.) compared to P0 nodes 602 and P1 nodes 604, P2 nodes 610 have relatively lower processing efficiency. On the other hand, since P0 nodes 602 provide relatively lower processing intelligence (e.g., it can perform less complicated packet filtering, packet manipulation, packet forwarding, etc.) compared to P1 nodes 604 and P2 nodes 610, P0 nodes 602 have relatively higher processing efficiency compared to P1 nodes 604 and P2 nodes 610. When creating the service chain 600, the service chain creation module 122 in the fabric manager 100 may consider the relationship shown in FIG. 6B, and automatically determine whether to include P0 node, P1 node, P2 node, or any combination of the foregoing, in the service chain 600.

Specialized Processing System Architecture

Figure 7:
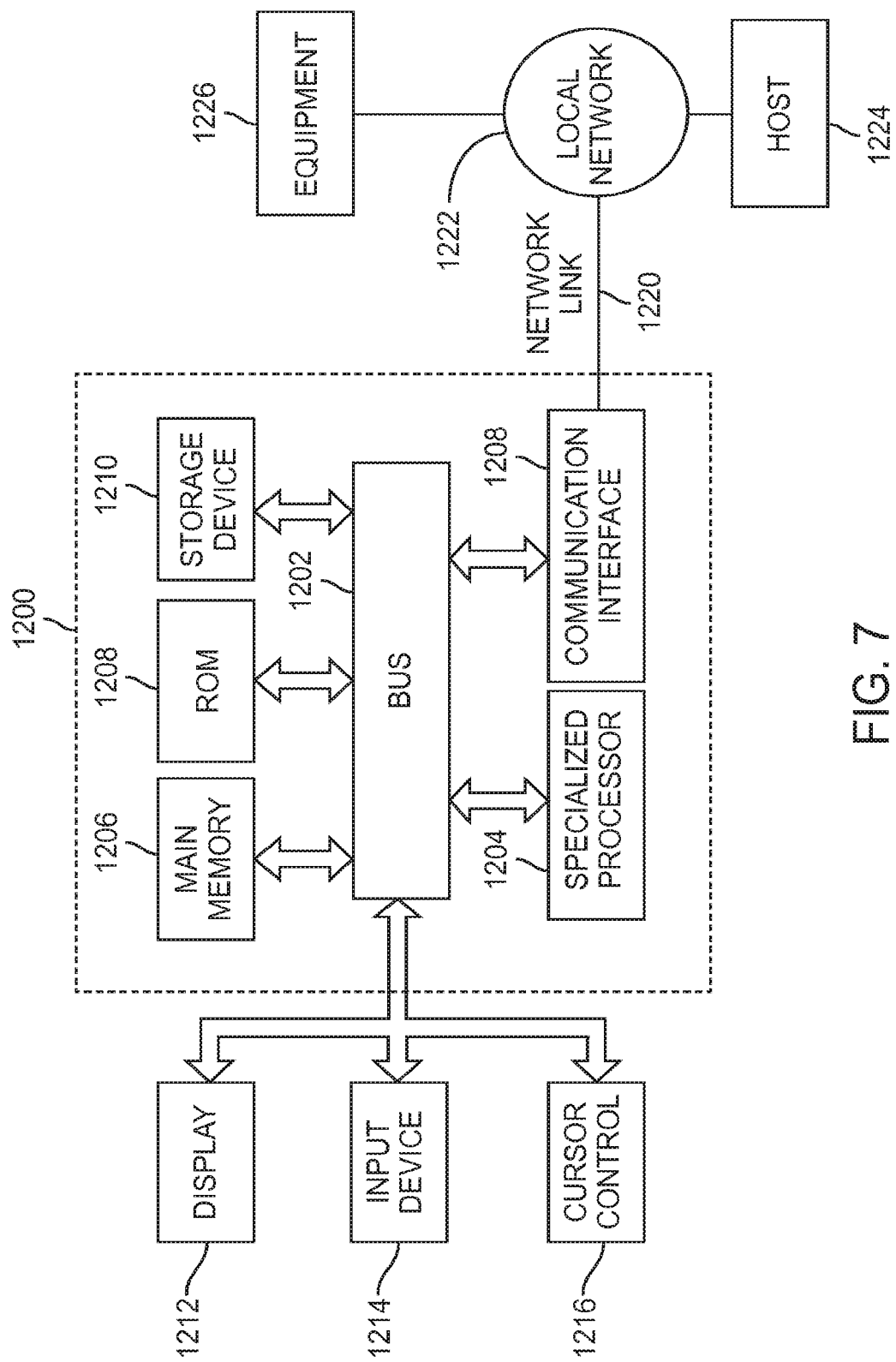
FIG. 7 illustrates a specialized processing system with which embodiments described herein may be implemented.

FIG. 7 is a block diagram that illustrates an embodiment of a specialized processing system 1200 upon which embodiments described herein may be implemented. For example, in some embodiments, the specialized processing system 1200 may be used to implement one or more functions of the processing unit 102, or one or more functions of the fabric manager 100 described herein. Processing system 1200 includes a bus 1202 or other communication mechanism for communicating information, and a processor 1204 coupled with the bus 1202 for processing information. The processor 1204 may be used to perform various functions described herein. For examples, the processor 1204 may be a specialized processor having a service chain creation module.

The processing system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The processing system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The processing system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The processing system 1200 may be used for performing various functions in accordance with the embodiments described herein. According to one embodiment, such use is provided by processing system 1200 in response to processor 1204 executing one or more sequences of one or more instructions contained in the main memory 1206. Such instructions may be read into the main memory 1206 from another processor-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "processor-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of processor-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the processing system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The processing system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the processing system 1200, are exemplary forms of carrier waves transporting the information. The processing system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A system comprising:
    at least one memory to store information regarding a plurality of nodes that includes a first node, and a second node, and a third node, the information including an efficiency level associated with each node of the plurality of nodes representing a packet processing efficiency for each node, the information further including a first hierarchical relationship based on the efficiency level associated with each node of the plurality of nodes indicative of the packet processing efficiency for each of the nodes of the plurality of nodes, the information further including an intelligence level associated with each node of the plurality of nodes representing a packet processing intelligence for each node, and the information further including a second hierarchical relationship based on the intelligence level associated with each node of the plurality of nodes indicative of the packet processing intelligence for each of the nodes of the plurality of nodes, the packet processing efficiency representative of resource usage, the packet processing intelligence representative of processing complexity; and
    a processing circuit configured to create a service chain by selecting the first node and the third node of the plurality of nodes for inclusion in the service chain and omitting the second node of the plurality of nodes from inclusion in the service chain based on a determined functionality to be performed on data to be provided to the service chain, the efficiency level of each node in the first hierarchical relationship, and the intelligence level of each node in the second hierarchical relationship.

2. The system of claim 1, wherein the characteristics represent that the first node and the second node are at different levels within the first hierarchical relationship, and also represent that the first node and the second node are at different levels within the second hierarchical relationship.

3. The system of claim 2, wherein the characteristics represent that the first node is at a first level within the first hierarchical relationship and at a second level within the second hierarchical relationship, and that the second node is at a second level within the first hierarchical relationship and at a first level within the second hierarchical relationship, wherein the first level within the first hierarchical relationship corresponds to more processing complexity than the second level of the first hierarchical relationship, and wherein the first level within the second hierarchical relationship corresponds to lower resource usage than the second level of the second hierarchical relationship.

4. The system of claim 1, wherein the service chain is created by establishing virtual links among the two or more of the plurality of nodes.

5. The system of claim 1, wherein the processing circuit is configured to determine functionalities to be performed on data to be provided to the service chain, and wherein the service chain is also created based on the functionalities to be performed on the data.

6. The system of claim 5, wherein the first hierarchical relationship representing that the first node corresponds to more processing complexity than the second node and representing that the second node corresponds to more processing complexity than the third node, and the service chain is created to provide the data from the first node to the third node and bypass the second node based on the first hierarchical relationship and the functionalities to be performed on the data.

7. The system of claim 1, wherein nodes at different levels of the first hierarchical relationship or at different levels of the second hierarchical relationship correspond to different types of network components, each of the different types of network components providing different functionalities.

8. A method comprising:
    determining a first hierarchical relationship of a plurality of nodes based on an efficiency level for each node of the plurality of nodes indicative of packet processing efficiency for each node of the plurality of nodes, the packet processing efficiency representative of resource usage, the plurality of nodes including a first node, a second node, and a third node;
    determining a second hierarchical relationship of the plurality of nodes based on an intelligence level for each node of the plurality of nodes indicative of packet processing intelligence for each node of the plurality nodes, the packet processing intelligence representative of processing complexity; and
    generating, by a processor, a service chain by selecting the first node and the third node of the plurality of nodes for inclusion in the service chain and omitting the second node of the plurality of nodes from inclusion in the service chain based on a determined functionality to be performed on data to be provided to the service chain, the efficiency level of each node in the first hierarchical relationship, and the intelligence level of each node in the second hierarchical relationship.

9. The method of claim 8, wherein the first hierarchical relationship represents that the first node and the second node are at different levels within the first hierarchical relationship, and the second hierarchical relationship represents that the first node and the second node are at different levels within the second hierarchical relationship.

10. The method of claim 9, wherein the first node is at a first level within the first hierarchical relationship and at a second level within the second hierarchical relationship, and that the second node is at a second level within the first hierarchical relationship and at a first level within the second hierarchical relationship, wherein the first level within the first hierarchical relationship corresponds to more processing complexity than the second level of the first hierarchical relationship, and wherein the first level within the second hierarchical relationship corresponds to lower resource usage than the second level of the second hierarchical relationship.

11. The method of claim 10, wherein the service chain is generated by establishing virtual links among the two or more of the plurality of nodes.

12. The method of claim 8, further comprising:
    determining functionalities to be performed on data to be provided to the service chain, wherein the service chain is also generated based on the functionalities to be performed on the data.

13. The method of claim 12, wherein the first hierarchical relationship representing that the first node corresponds to more processing complexity than the second node and representing that the second node corresponds to more processing complexity than the third node, and the service chain is generated to provide the data from the first node to the third node and bypass the second node based on the first hierarchical relationship and the functionalities to be performed on the data.

14. The method of claim 8, wherein each of the nodes at different levels of the first hierarchical relationship or at different levels of the second hierarchical relationship correspond to different types of network components, each of the different types of network components providing different functionalities.

15. A computer program product including one or more non-transitory computer-readable media storing computer program instructions, execution of which by a processing system causes the processing system to perform operations comprising:
   determine a first hierarchical relationship of a plurality of nodes based on an efficiency level associated each node of the plurality of nodes including a first node, a second node, and a third node, the efficiency level representing a packet processing efficiency, the packet processing efficiency representative of resource usage;
   determine a second hierarchical relationship of the plurality of nodes based on an intelligence level for each node of the plurality of nodes, the intelligence level representing a packet processing intelligence, the packet processing intelligence representative of processing complexity; and
   generate a service chain by selecting the first node and the third node of the plurality of nodes for inclusion in the service chain and omitting the second node of the plurality of nodes from inclusion in the service chain based on a determined functionality to be performed on data to be provided to the service chain, the efficiency level of each node in the first hierarchical relationship, and the intelligence level of each node in the second hierarchical relationship.

16. The computer program product of claim 15, wherein the first hierarchical relationship represents that the first node and the second node are at different levels within the first hierarchical relationship, and the second hierarchical relationship represents that the first node and the second node are at different levels within the second hierarchical relationship.

17. The computer program product of claim 16, wherein the first node is at a first level within the first hierarchical relationship and at a second level within the second hierarchical relationship, and that the second node is at a second level within the first hierarchical relationship and at a first level within the second hierarchical relationship, wherein the first level within the first hierarchical relationship corresponds to more processing complexity than the second level of the first hierarchical relationship, and wherein the first level within the second hierarchical relationship corresponds to lower resource usage than the second level of the second hierarchical relationship.

18. The computer program product of claim 17, wherein the service chain is generated by establishing virtual links among the two or more of the plurality of nodes.

19. The computer program product of claim 15, the computer program instructions further cause the one or more computing devices to:
   determine functionalities to be performed on data to be provided to the service chain, wherein the service chain is also generated based on the functionalities to be performed on the data.

20. The computer program product of claim 19, wherein the first hierarchical relationship representing that the first node corresponds to more processing complexity than the second node and representing that the second node corresponds to more processing complexity than the third node, and the service chain is generated to provide the data from the first node to the third node and bypass the second node based on the first hierarchical relationship and the functionalities to be performed on the data.

* * * * *